(12) United States Patent
Gabbianelli et al.

(10) Patent No.: US 12,331,565 B2
(45) Date of Patent: Jun. 17, 2025

(54) MODULAR INDIVIDUALLY OPERABLE VEHICLE DOOR

(71) Applicants: MAGNA INTERNATIONAL INC., Aurora (CA); Gianfranco Gabbianelli, Birmingham, MI (US); Azhagu Subramanian, Troy, MI (US); Sathvik Srinivas, Rochester Hills, MI (US); Warren Young, Troy, MI (US); Joel Stiverson, St. Clair Shores, MI (US)

(72) Inventors: Gianfranco Gabbianelli, Birmingham, MI (US); Azhagu Subramanian, Troy, MI (US); Sathvik Srinivas, Rochester Hills, MI (US); Warren Young, Troy, MI (US); Joel Stiverson, St. Clair Shores, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 18/265,082

(22) PCT Filed: Dec. 8, 2021

(86) PCT No.: PCT/US2021/062371
§ 371 (c)(1),
(2) Date: Jun. 2, 2023

(87) PCT Pub. No.: WO2022/125638
PCT Pub. Date: Jun. 16, 2022

(65) Prior Publication Data
US 2024/0093538 A1 Mar. 21, 2024

Related U.S. Application Data

(60) Provisional application No. 63/123,059, filed on Dec. 9, 2020.

(51) Int. Cl.
*B60J 5/04* (2006.01)
*B60J 10/86* (2016.01)
(Continued)

(52) U.S. Cl.
CPC ............. *E05B 83/38* (2013.01); *B60J 5/0422* (2013.01); *B60J 10/86* (2016.02); *E05B 81/06* (2013.01);
(Continued)

(58) Field of Classification Search
CPC ......... E05D 15/34; E05D 3/147; E05D 15/28; E05Y 2800/20; E05Y 2800/272; E05Y 2900/531; E05B 79/04; E05F 11/382
(Continued)

(56) References Cited

U.S. PATENT DOCUMENTS 2,987,336 A 6/1961 Kramer
5,193,861 A 3/1993 Juga et al.
(Continued)

FOREIGN PATENT DOCUMENTS

DE 102016212805 A1 * 1/2018
EP 1188889 A1 3/2002
(Continued)

*Primary Examiner* — Jerry E Redman
(74) *Attorney, Agent, or Firm* — Dickinson Wright PLLC

(57) ABSTRACT

A vehicle door system includes doors with a door module attached to a hinge module, which is attached to the vehicle body. The door module includes a latch mechanism configured to engage a striker pin of the vehicle body, with a pawl that pivots to accommodate a misalignment with the striker pin during a door closing operation, with the latch mechanism shifting following engagement with the striker pin. A door check mechanism includes a permanent magnet and a steel plate. Activation of the permanent magnet shifts the steel plate from a closed position to an open position permitting the hinge module to move from a locked position.

(Continued)

An interface between doors includes a primary and secondary seal each having a constant cross section, with filler pieces disposed between the door and the secondary seal along a portion of the interface.

20 Claims, 23 Drawing Sheets

(51) Int. Cl.
    *E05B 81/06*     (2014.01)
    *E05B 81/14*     (2014.01)
    *E05B 81/30*     (2014.01)
    *E05B 83/38*     (2014.01)
    *E05D 11/10*     (2006.01)
    *E05D 15/34*     (2006.01)
    *E05B 81/34*     (2014.01)

(52) U.S. Cl.
    CPC .............. *E05B 81/14* (2013.01); *E05B 81/30* (2013.01); *E05D 11/1007* (2013.01); *E05D 15/34* (2013.01); *E05B 81/34* (2013.01)

(58) Field of Classification Search
    USPC ................................................ 49/61–63, 502
    See application file for complete search history.

(56) References Cited

U.S. PATENT DOCUMENTS

| | | | |
|---|---|---|---|
| 5,782,523 A | 7/1998 | Heldt et al. | |
| 6,616,214 B2 * | 9/2003 | Wattebled | E05B 83/38 |
| | | | 292/26 |
| 8,555,552 B2 * | 10/2013 | Hooton | B60J 10/244 |
| | | | 49/477.1 |
| 9,073,413 B2 * | 7/2015 | Maruyama | B60J 5/047 |
| 9,849,759 B2 * | 12/2017 | Lovelace | E06B 3/362 |
| 10,337,227 B2 * | 7/2019 | Stoof | E05D 3/127 |
| 10,369,870 B2 * | 8/2019 | Linden | E05F 17/004 |
| 10,960,739 B2 * | 3/2021 | Choi | B60J 5/0479 |
| 11,072,228 B2 * | 7/2021 | Choi | B60J 10/33 |
| 11,525,291 B2 * | 12/2022 | Salter | E05B 81/06 |
| 11,807,080 B2 * | 11/2023 | Gabbianelli | B60J 5/0479 |
| 12,000,186 B1 * | 6/2024 | Mapson | E05D 15/101 |
| 2013/0047519 A1 * | 2/2013 | Hooton | B60J 10/86 |
| | | | 49/477.1 |
| 2014/0077523 A1 * | 3/2014 | Choi | B60J 5/06 |
| | | | 296/203.03 |
| 2015/0360547 A1 * | 12/2015 | Ogawa | B60J 10/84 |
| | | | 49/368 |
| 2016/0348409 A1 * | 12/2016 | Choi | E05B 83/40 |
| 2017/0254132 A1 | 9/2017 | Stoof et al. | |
| 2017/0342751 A1 | 11/2017 | Tamura et al. | |
| 2017/0342767 A1 * | 11/2017 | Sakakibara | B60J 5/0479 |
| 2018/0298647 A1 * | 10/2018 | Baskar | E05B 77/36 |
| 2020/0080348 A1 | 3/2020 | Cappelli et al. | |
| 2020/0283069 A1 * | 9/2020 | Choi | B21D 7/06 |
| 2020/0308882 A1 * | 10/2020 | Salter | E05B 81/08 |
| 2021/0372173 A1 * | 12/2021 | Okeke | E05B 85/04 |
| 2023/0340829 A1 * | 10/2023 | Choi | E05F 15/63 |
| 2024/0254812 A1 * | 8/2024 | Seo | E05B 81/20 |

FOREIGN PATENT DOCUMENTS

| | | | | |
|---|---|---|---|---|
| EP | 3587155 A1 | | 1/2020 | |
| JP | 2000280744 A | * | 10/2000 | ............ B60J 5/0479 |
| WO | 2020106940 A1 | | 5/2020 | |

* cited by examiner

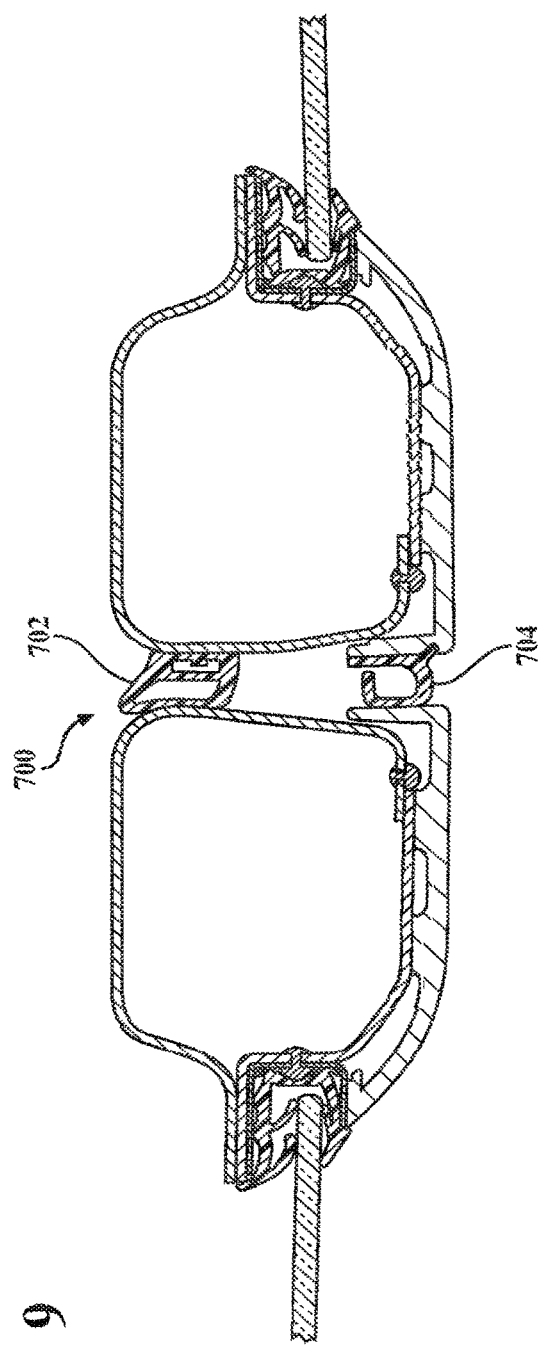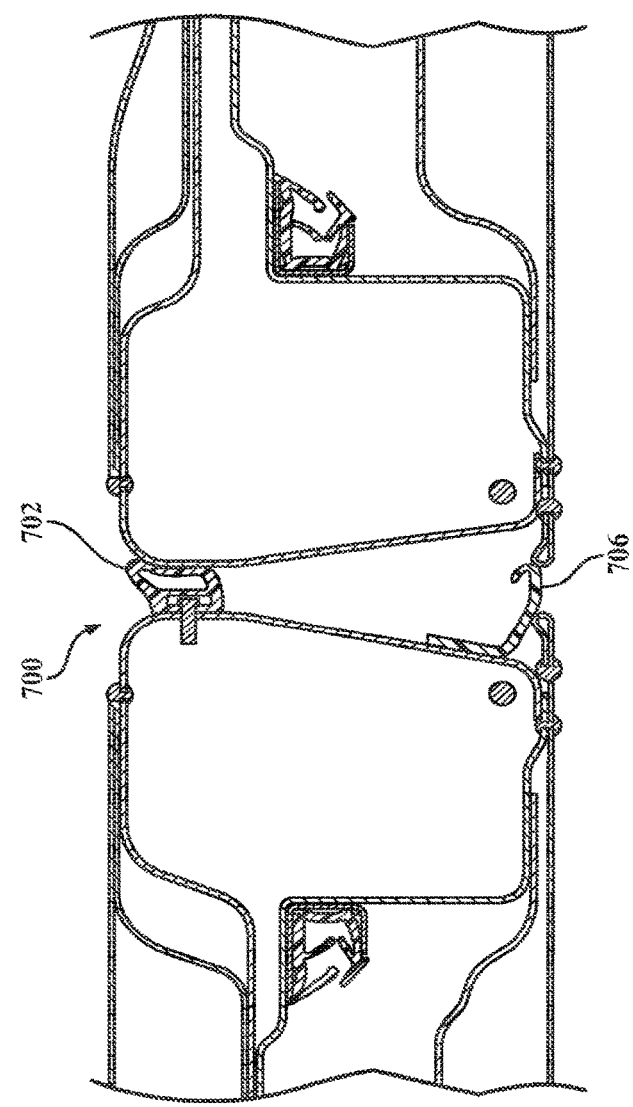
FIG. 9
FIG. 10

MODULAR INDIVIDUALLY OPERABLE VEHICLE DOOR

CROSS-REFERENCE TO RELATED APPLICATIONS

This U.S. National Stage Patent Application claims the benefit of PCT International Patent Application Serial No. PCT/US2021/062371 filed Dec. 8, 2021 entitled "MODULAR INDIVIDUALLY OPERABLE VEHICLE DOOR" which claims the benefit of and priority to U.S. Provisional Patent Application Ser. No. 63/123,059, filed Dec. 9, 2020, titled "Modular Individually Operable Vehicle Door," the entire disclosures of which are hereby incorporated by reference.

TECHNICAL FIELD

The present disclosure relates to doors in passenger vehicles. More particularly, the present disclosure relates to individually operable modular doors for a passenger vehicle.

BACKGROUND OF THE DISCLOSURE

Passenger vehicles, such as traditional automotive vehicles and electric vehicles, include various vehicle components assembled together. The vehicle body is typically constructed to define a vehicle cabin which the passengers and driver of the vehicle will sit during operation of the vehicle. The vehicle body typically includes a plurality of doors permitting ingress and egress of passengers as necessary.

The vehicle body is designed to support various internal components, and is supported by a vehicle chassis disposed below the vehicle body, with the chassis supporting various other vehicle components that when combined with the vehicle body and interior define the overall vehicle assembly. Various safety standards and requirements require the various assembled vehicle components to withstand collisions as well as typical vehicle use to adequately protect the passengers within the vehicle, as well as protecting the vehicle from substantial damage in response to vehicle collisions.

Traditional vehicle bodies may include what are typically referred to as an A-pillar, a B-pillar, and a C-pillar, which are structural portions of the vehicle body that typically define the openings in the vehicle through which passengers can enter and exit the vehicle via the installed doors. The A-pillars are disposed at the front of the vehicle, with the vehicle windshield extending laterally between the A-pillars. The C-pillars are disposed at the rear of the vehicle, with the rear window of the vehicle extending laterally between the C-pillars. The B-pillars are disposed at the center of the vehicle, longitudinally between the A-pillar and C-pillar.

In a typical four-door passenger vehicle, the front doors are supported by the A-pillar by multiple hinges, with the front doors pivoting about an axis disposed near the A-pillar. The front doors may further include a latching mechanism that mates with a corresponding structure disposed at the B-pillar. The rear doors are typically supported by the B-pillar by multiple hinges, with the rear doors pivoting about an axis near the B-pillar. The rear doors typically include a latching mechanism that mates with corresponding structure disposed at the C-pillar.

When the doors are open, they are supported by the hinges in a cantilevered fashion from the pillar to which they are attached. When the doors are closed, the doors are additionally supported by the latching mechanism mating with the corresponding pillar.

In some vehicles, multiple doors are disposed at a single opening, such as in passenger vans. In these vehicles, a rear door may instead be supported by a pillar disposed rearward from the door. The front and rear door of this double door arrangement may mate with each other, with one of the doors including a portion of the latching mechanism, and the other of the doors including the remainder of the latching mechanism. This type of arrangement may be undesirable, as it may require both doors to be accurately aligned so that their corresponding latching structure may operate as intended.

The double door arrangement is not limited to van type vehicles. This arrangement may also be used in vehicles that do not include a B-pillar. The double door arrangement may be desirable in some cases, providing a larger overall opening, making passenger entry and exit easier, and further allowing for larger cargo to be placed within a vehicle. However, the double door arrangement typically requires one of the doors to be opened first, and the other door to be opened second. Similarly, when closing the doors, one of the doors must be closed before the other. This can lead to undesirable results, where a passenger may not be able to exit the vehicle independently, or it may lead to vehicle damage if the wrong door is closed first, causing the following door's structure to impact the previously closed door.

In view of the foregoing, there remains a need for improvements to passenger vehicle door systems.

SUMMARY OF THE INVENTION

A system for opening and closing a door relative to a vehicle body is provided. The system includes first and second vehicle doors, each of the first and second vehicle doors including a hinge module configured for being mounted to a vehicle body and a door module configured for being mounted to the hinge module and further configured for closing a door opening defined by the vehicle body. The door module includes an embedded pillar structure disposed at a front or rear edge thereof.

The hinge module includes a hinge bracket configured to be mounted to the vehicle body and arms pivotally attached thereto. The hinge module further includes a brace pivotally attached to the arms, wherein the brace is moveable between a closed position and an open position in response to movement of the arms relative to the hinge bracket.

The door module is attached to the brace via a plurality of corresponding attachment points between the cross brace and the door module. The door module includes a latch mechanism, the latch mechanism configured for latching with the vehicle body.

The first vehicle door mates with the second vehicle door and defines an interface therebetween. The embedded pillars of the first and second doors are disposed adjacent each other at the interface. Each of the first and second vehicle doors are individually operable relative to each other such that either the first or the second door may be opened and closed while the other remains latched with the vehicle body.

In one aspect, the door module is not directly hinged to the vehicle body.

In one aspect, the arms of the hinge module include an upper arm and a lower arm each having first and second ends, each of which are pivotally attached to the hinge bracket at the first end and the brace at the second end.

In one aspect, the first end of the upper arm is offset in a first direction from the first end of the lower arm, and the second end of the upper arm is offset in the second direction from the lower arm when the door module is in a closed position.

In one aspect, the first arm is generally straight and extends in a first direction, and the second arm is bent and includes an upper portion, an angled portion, and a lower portion, wherein the angled portion is arranged at an oblique angle relative to the upper arm.

In one aspect, the latch mechanism is disposed at a bottom edge of each of the door modules.

In one aspect, the first and second doors do not latch to each other when the first and second doors are in a closed position.

In one aspect, the brace is in the form of a cross-brace or an I-brace.

In one aspect, the system further includes at least one of a powered actuator operatively coupled to each of the doors and configured to automatically open each of the doors, a cinch mechanism operatively coupled to each of the doors and configured to cinch the doors to a closed position, and a latch mechanism associated with each of the doors and configured to maintain the doors in an open position.

In one aspect, the embedded pillar is defined by an outer bent portion attached to an inner bent portion.

In one aspect, the embedded pillar is disposed inwardly relative to an outer sheet of the door panel and outwardly relative to an inner sheet of the door panel.

In one aspect, the outer sheet defines a hem flange disposed at the interface between the first and second vehicle doors, wherein the hem flange is bonded to the embedded pillar.

In one aspect, the inner bent portion wraps around the outer bent portion, wherein the outer bent portion is disposed inward from the inner bent portion relative to the interface, wherein the hem flange is bonded to the inner bent portion.

In one aspect, the system further includes a sealing system disposed between the first door and the second door, wherein the sealing system is attached to only one of the first door and the second door.

In another aspect, a method for installing a vehicle door is provided. The method includes the step of attaching a first and a second hinge module to a vehicle body, the hinge modules each including a hinge bracket, arms extending from the hinge bracket and pivotally attached to the hinge bracket, and a brace pivotally attached to the arms, wherein the hinge bracket is attached to the vehicle body.

The method further includes attaching a first door module to the first hinge module and attaching a second door module to the second hinge bracket, wherein each of the door modules includes a plurality of attachment points, and the plurality of attachment points are attached to the brace of the first or second hinge module. Each of the door modules includes an embedded pillar structure at a front or rear edge thereof. Each of the door modules includes a latch mechanism, and the latch mechanism engages the vehicle body when the door is installed in a closed position.

The method further includes opening and closing the first and door module when the second door module remains in a latched position with the vehicle body and opening and closing the second door module when the first door module remains in a latched position with the vehicle body.

In one aspect, the method includes latching the first door module to the vehicle body and latching the second door module to the vehicle without latching the first door module to the second door module.

In one aspect, the embedded pillar is defined by a bent inner portion and a bent outer portion, wherein the bent inner portion wraps around the bent outer portion such that the bent inner portion is disposed closer to the interface than the bent outer portion, wherein the embedded pillar is disposed between an inner sheet and outer sheet of the corresponding first and second door module.

In another aspect, a system for opening and closing a door relative to a vehicle body is provided. The system includes: first and second vehicle doors, each of the first and second vehicle doors including: a hinge module configured for being mounted to a vehicle body; a door module configured for being mounted to the hinge module and further configured for closing a door opening defined by the vehicle body, wherein the door module includes an embedded pillar structure disposed at a front or rear edge thereof; a latch mechanism disposed on the door module and configured to engage a striker pin projecting from the vehicle body, the latch mechanism comprising: a mounting plate configured for attachment to the pillar structure; a pawl pivotally attached to the mounting plate and pivotable about a pivot axis; compression springs attached to opposite sides of the pawl biasing the pawl to a nominal closed position; wherein misaligned entry of the striker pin pivots the pawl about the pivot axis from a nominal position to a shifted position and, following insertion of the striker pin, the pawl returns to the nominal position and the mounting plate shifts relative to the pillar structure.

In one aspect, the pawl includes a first portion and a second portion, the first and second portions pivotable outward about the pivot axis in response to insertion of the striker pin.

In one aspect, the compression springs are attached to each of the first and second portions of the pawl and bias the first and second portions into a closed position.

In one aspect, the secondary latch mechanism is releasable via a power actuator and a cam that opens the pawl.

In one aspect, the secondary latch mechanism is releasable via a mechanical backup lever that moves the cam that opens the pawl.

In one aspect, the mounting plate or pillar structure includes oversize mounting holes permitting shifting of the mounting plate relative to the pillar structure.

In one aspect, a door presenter mechanism is disposed between the vehicle body and the vehicle door.

In another aspect, a system for opening and closing a door relative to a vehicle body includes: first and second vehicle doors, each of the first and second vehicle doors including: a hinge module configured for being mounted to a vehicle body; a door module configured for being mounted to the hinge module and further configured for closing a door opening defined by the vehicle body, wherein the door module includes an embedded pillar structure disposed at a front or rear edge thereof; wherein the door module includes a latch mechanism, the latch mechanism configured for latching with the vehicle body; wherein the first vehicle door mates with the second vehicle door and defines an interface therebetween, wherein the embedded pillars of the first and second doors are disposed adjacent each other at the interface; wherein the interface includes a sealing arrangement including a primary seal disposed an inner side of the interface and secondary seal disposed at an outer side of the interface, wherein the primary and second seals have a constant cross-section extending substantially fully along the interface.

In one aspect, at the location of the secondary seal, a lower portion of the interface is wider than an upper portion, and wherein filler pieces are disposed between the secondary seal and the door modules in the lower portion.

In one aspect, the primary and secondary seals are attached to a single door.

In another aspect, a system for opening and closing a door relative to a vehicle body includes: first and second vehicle doors, each of the first and second vehicle doors including: a hinge module configured for being mounted to a vehicle body; a door module configured for being mounted to the hinge module and further configured for closing a door opening defined by the vehicle body, wherein the door module includes an embedded pillar structure disposed at a front or rear edge thereof; wherein the door module includes a latch mechanism, the latch mechanism configured for latching with the vehicle body; wherein the hinge module includes a first hinge bar and a second hinge bar pivotable relative to each during a door opening operation; a hinge pin extending between the first hinge bar and the second hinge bar, the hinge bar fixed to the first hinge bar; a permanent magnet fixed to the lower hinge bar; a ring bracket fixed to the permanent magnet; a steel plate biased toward the permanent magnet, wherein the steel plate locks with the ring bracket when the steel plate is in a closed position adjacent the permanent magnet, and wherein the steel plate is rotatable relative to the ring bracket when the steel plate is in an open position away from the permanent magnet; wherein energizing the permanent magnet shifts the steel plate from the closed position to the open position allowing relative movement between the first hinge bar and the second hinge bar.

In one aspect, the steel plate is mounted to the hinge pin and slidably attached to the hinge pin.

In one aspect, the steel plate is rotationally fixed to the hinge pin.

In one aspect, the first hinge bar is an upper hinge bar attached to the door module and the second hinge bar is a lower hinge bar pivotably attached to the vehicle body.

In one aspect, the ring bracket includes axially projecting teeth and the steel plates includes corresponding notches for receiving the teeth in the closed position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 is a cross-sectional view illustrating the sealing mechanism disposed between the two vehicle doors;

FIG. 10 is another cross-sectional view illustrating the sealing mechanism disposed between the two vehicle doors;

DESCRIPTION OF THE ENABLING EMBODIMENT

Figure 1:
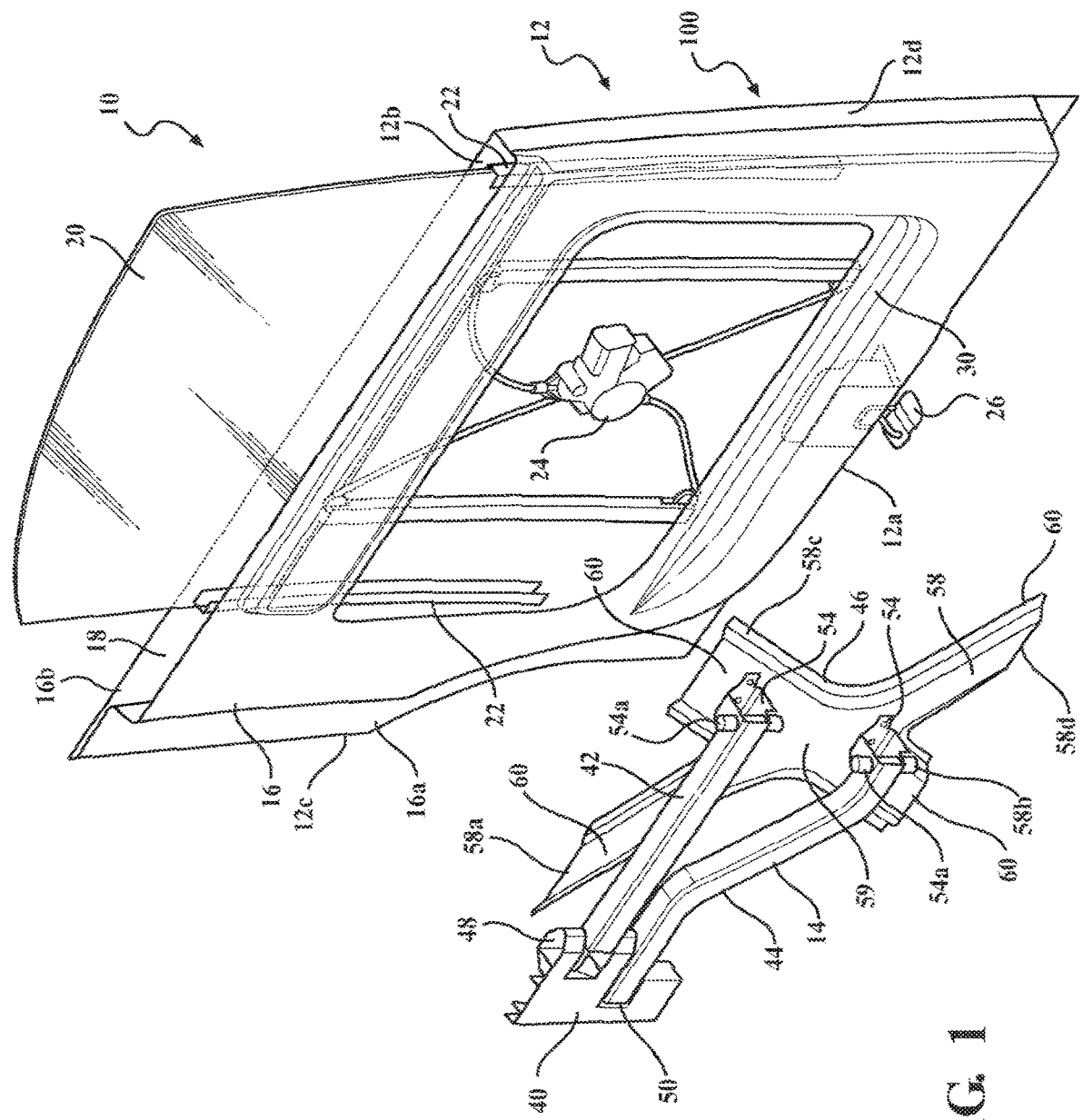
FIG. 1 is a perspective view of a vehicle door system illustrating a hinge module and a door module, where the door module may be attached to the hinge module.

Referring to FIG. 1, a vehicle door system 10 is provided. The system 10 is configured to attach to a vehicle body (not shown), and includes a door modules 12 and a hinge module 14. The hinge module 14 is configured to attach to the vehicle body and the door module 12, with the hinge module 14 being manipulated to effect a corresponding movement of the door module 12 relative to the vehicle body. The door module 12 is fixed to the hinge module 14, and is moveable between an engaged/closed position relative to the vehicle body and a disengaged/open position relative to the vehicle body.

The door module 12 does not remain engaged with a portion of the vehicle body when the door module 12 is in the open position as in traditional hinged connections between a vehicle door and vehicle body pillar. Rather, the door module 12 may effectively fully separate from the vehicle body when opened. It will be appreciated that the door module 12 is still ultimately coupled to the vehicle body via the hinge module 14, but the door module 12 does not pivot about an axis near one of the vehicle body pillars as in traditional hinged vehicle door designs. Further, it will be appreciated that the reference to traditional hinged vehicle door designs refers to arrangements where the door is attached to the vehicle body via a simple hinge arrangement, and that the door may not directly contact the vehicle body when opened. The present system 10 differs from this traditional arrangement, which will be described in further detail below.

With further reference to the door module 12 shown in FIG. 1, the door module 12 may include a number of components that may be assembled prior to installation to the hinge module 14 and ultimately with the remainder of the vehicle. The door module 14 may include a door panel 16 that generally defines the outer profile and overall shape of the door module 12. The door panel may have an inner portion 16a and an outer portion 16b. The outer portion 16b is the portion of the door panel 16 that faces the exterior of the vehicle body, and the inner portion 16a is the portion that faces the interior of the vehicle. The inner portion 16a and the outer portion 16b may be fixed to each other in a known manner, such as via welding, fasteners, adhesives, or a combination of these attachment mechanisms. The inner and outer portions 16a, 16b are preferably fixed in place relative to each other.

The inner portion 16a and outer portion 16b may combine to define an internal cavity 18 therebetween. The internal cavity 18 may include additional structure which may be mounted to the door panel 16 via the inner portion 16a, the outer portion 16b, or both. The internal cavity 18 may further include wire harness components that provide power and communication to the internally mounted components.

The door module 12 may include multiple window components, which may be in the form of power operated window components or manually operated window components. For purposes of discussion, the power window components will be described. The door module 12 may include window glass 20 that may be disposed within the cavity 18 when the window is in an position and which may be extended out of the cavity when the window is in a closed position, with the glass 20 having intermediate positions between fully opened and fully closed positions.

The glass 20 is supported for movement by guide channels 22 that may be disposed on opposite side of the glass 20. The channels 22 are disposed within the cavity 18 and attached to the door panel 16 in a generally fixed position. When the window is operated, the glass 20 will be moved relative to the channels 22, which allow movement of the glass 20 typically along one axis of movement, in opposite directions depending on when the window is being opened or closed. The channels 22 may have a U-shape, with the base of the "U" receiving the edges of the glass 20.

The door module 12 may further include a window regulator 24, which is part of an overall window regulator assembly that also includes pulleys, a regulator cable, regulator carriage, regulator track, motor, and drive mechanism. The window regulator 24 and associated system may be a traditional system, in which the window glass 20 is attached to the carriage portion, and actuation of the regulator 24 will drive the window glass 20 between open and closed position by actuating the various interconnected elements.

The door module 12 may further include a latch mechanism 26, which may be a powered latch, manual latch, or both a powered and manual latch. The latch mechanism 26 is configured to receive an electronic or manual signal, which will actuate the latch mechanism 26 to open the latch and permit movement of latch relative to corresponding latch structure. The latch mechanism 26 may be partially or completely disposed within the cavity 18, with a portion of the latch mechanism 26 being exposed from the door panel 16, either via an opening in the panel providing access to the cavity, or via an extension of the latch mechanism that extends out from the cavity 18.

The latch mechanism may be disposed at a bottom portion 12a of the door module 12. The door module 12 may also include a top portion 12b, a front portion 12c, and a rear portion 12d. Each of the portions may include corresponding edges that define the outer profile of the door module 12. The door module 12 described herein is in reference to a "front" door of a vehicle. The description herein applies equally to a "rear" door of a vehicle (meaning the door that is typically rearward and adjacent the "front" door of the vehicle, and not to the rear vehicle hatch, or the like). However, it will be appreciated that the disclosed functionality and structure of the door module 12 may also be used for cargo doors or "back" doors, such as the doors at the back of a cargo van or the like. Put another way, the disclosed structure may be utilized as one half of a double door arrangement, with the other door having similar or the same structural features mirrored across the mating plane between the double doors, or the structure may be utilized as a single door.

Each edge or portion of the door module 12 is configured to mate with corresponding structure, and may include a sealing member or the like along the edge to limit intrusion or water or debris into the vehicle cabin when the door module 12 is in a closed position. The front and top edges of the door module 12 may be configured to mate with a corresponding edge of the vehicle body, and without interposition of other mounting structure or hardware between the vehicle body and the edge of the door module 12. This is different from a traditional door module, in which the front edge of the door would typically include a connection to a hinge mechanism mounted to the vehicle body, with the hinge mechanism being attached directly between the vehicle body and the front edge of the door.

The bottom edge has the latch mechanism 26, which may be disposed at a middle area of the bottom edge. The latch mechanism 26 is configured to mate with corresponding structure disposed on a bottom edge of the door opening defined by the vehicle body.

The rear edge may be configured to mate with a front edge portion of a "rear" version of the door module 12. As described above, the "rear" version may be the same or similar to the described door module 12, but mirrored. One alternative embodiment of a door module 112 and a hinge module 114 is described below in further detail, and is illustrated as a "rear" version. Features of the door module 112 and hinge module 114 discussed below may also be applied to a "front" version. Accordingly, the features of the door module 12 and hinge module 14 described herein may also be applied to a corresponding second door, and the features of the door module 112 and hinge module 114 may likewise be applied to a second door. Accordingly, the rear edge of the rear version mates with the vehicle body, and the front edge of the rear version mates with the rear edge of the door module 12 described and illustrated. The "front" version shown and previously described will continue to be described herein.

Figure 8:
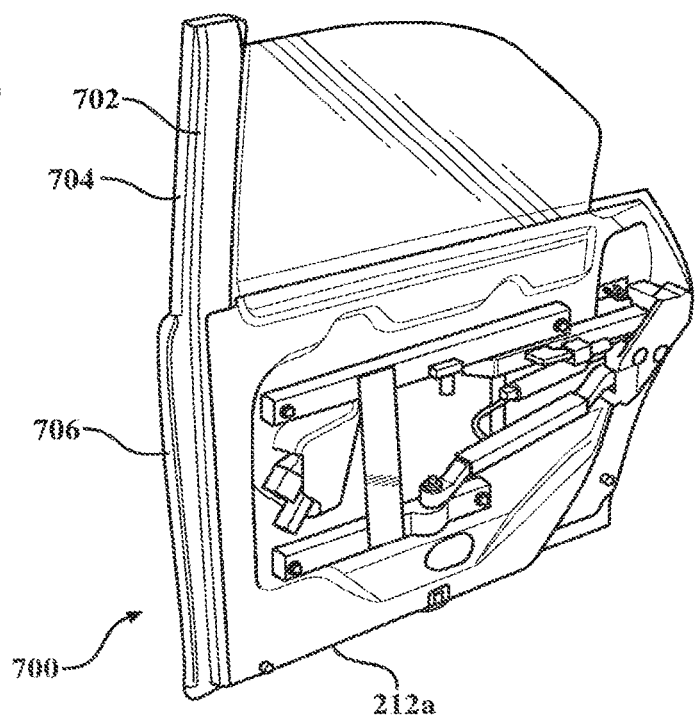
FIG. 8 is a perspective view of one of the two vehicle doors of FIG. 7 and illustrating a sealing mechanism disposed on the one door at the interface between the vehicle doors.

The rear edge of the door module 12 may include sealing structure 700 (shown in detail in FIGS. 8-10 and discussed further below with reference to FIGS. 8-10) that is configured to mate with another door rather than the structure of the vehicle body. The sealing structure may be in the form of a flexible and resilient lip portion that may be configured to flex inward or outward in response to an inward or outward force. The sealing structure may take other forms, as well. The sealing structure is preferably configured to allow the door module 12 to be independently opened or closed regardless of the open/closed state of the other door to which it can mate. This independent operation of the door module 12 is possible due to the latch mechanism 26 being disposed on the bottom edge of the door module 12, such that the latching mechanism does not mate with another door (as in traditional double door arrangements). The unique sealing method between the front and rear door at b-pillar enables independent operation of the doors as well. Thus, either door module 12 may be opened while the other remains closed, or both may be opened and closed in any order.

The door module 12 may further include attachment points 30 for attaching the hinge module 14 to the door module 12. The door module 12 may include four attachment points 30, with two of the attachment points disposed at an upper location, and two of the attachment points disposed at a lower location. The upper attachment points 30 may be disposed at approximately the same height on the door panel 16, and spaced apart longitudinally along the door panel 16. The attachment points 30 may be in the form of reinforced rigid structure, such as a threaded bushing or other fastener. The lower attachment points 30 may also be disposed at approximately the same height on the door panel 16 and spaced apart longitudinally along the door panel 16. Of course, it will be appreciated that the location of the attachment points 30 may vary, so long as the spacing of the hinge module 14 matches the spacing on the door module 12, and that such spacing is sufficient to support the weight of the door module 12.

The spacing between the lower attachment points 30 may be different than the spacing between the upper attachment points 30. For example, the spacing between the upper attachment points 30 may be larger than the spacing between the lower attachment points 30. The upper and lower attachment points 30 may be offset relative to each other longitudinally, such that no two attachment points 30 are disposed at the same longitudinal location. For example, the front upper attachment point 30 may be forward from the front lower attachment point 30, and the rear upper attachment point 30 may be forward from the rear lower attachment point 30. However, it will be appreciated that other distributions of the various attachment points may also be used that can sufficiently mate with corresponding structure of the hinge module 14.

Turning now to the hinge module 14, the hinge module may include a number of interconnected components that allow the hinge module 14 to shift and pivot relative to its attachment to the vehicle body. The hinge module 14 may include a hinge bracket 40 that is configured to be mounted to the vehicle body. The hinge bracket 40 may be configured to support an upper arm 42 and a lower arm 44 that are pivotable relative to the hinge bracket 40. The hinge module 14 may further include a cross brace 46 that is pivotably attached to the arms 42 and 44. The cross brace 46 is configured to attach to the door module 12. The cross brace 46 is one embodiment of a brace that may be used as part of the hinge module 14. An alternative I-brace 146 is described in reference to hinge module 114, and may also be used with the hinge module 14. Features of the cross brace 46 and hinge module 14 not relating to the shape of the cross brace 46 may also be applied to the I-brace 146.

The hinge bracket 40 may include an upper pivot pin 48 and a lower pivot pin 50, with the upper pivot pin 48 joining the upper arm 42 to the hinge bracket 40 and the lower pivot pin 50 joining the lower arm 44 to the hinge bracket 40. The upper pivot pin 48 may be disposed at a rearward longitudinal location relative to the lower pivot pin 50. The arms 42 and 44 are therefore mounted for pivoting relative to the hinge bracket 40. It will be appreciated that other types of pivoting connections may be used between the hinge bracket 40 and the arms 42 and 44.

The upper arm 42 may have a generally straight shape, extending longitudinally from the hinge bracket 40 when the hinge module 14 is in a closed position corresponding to the door module 12 being closed. The lower arm 44 may have a bent shape, with a first portion extending longitudinally from the hinge bracket 40, and then bending downward and extending rearward and downward, and the bending relatively upward to extend in a longitudinal direction. The lower arm 44 may be described as having a flattened S-shape or Z-shape. The lower arm 44 may therefore be considered to include an angled portion that is arranged at an oblique angle relative to the upper arm 42.

The upper arm 42 may extend to a longitudinal position that is rearward relative to the end of the lower arm 44 when the hinge module 14 is in a closed position. The upper arm 42 also begins from a longitudinal position that is rearward relative to the lower arm 44. Accordingly, the longitudinal distance between the ends of the upper arm 42 and the ends of the lower arm 44 may be approximately the same.

Given the bent shape of the lower arm 44 and the straight shape of the upper arm 42, the vertical distance between the ends of the arms 42 and 44 at the hinge bracket 40 is smaller than the vertical distance between the ends of the arms 42 and 44 opposite the hinge bracket 40. Thus, the ends of the arms 42 and 44 are spaced apart to sufficiently support the cross brace 46, which attaches to the door module 12.

The cross brace 46 may be attached to the arms 42 and 44 via brackets 54. The brackets 54 may be fixedly mounted to the cross brace 46, and may extend over the ends of the arms 42 and 44. The brackets 54 may attach to the ends of the arms 42 and 44 via pins 54a that extend through the structure of the arms 42 and 44. Thus, the brackets 54 are capable of pivotable rotation relative to the arms 42 and 44. Accordingly, the cross brace 46 may pivot relative to the arms 42 and 44. The lower bracket 54 is disposed forward relative to the upper bracket 54, similar to the lower pin 50 of the hinge bracket 40 being forward relative to the upper pin 50.

The cross brace 46 may have a general X-shape with arms 58 extending outward in four directions from a central hub portion 59. The arms 58 may include a front upper arm 58a, a front lower arm 58b, a rear upper arm 58c, and a rear lower arm 58d. Each of the arms 56 may extend a different distance from the central hub portion 59. The front upper arm 58a extends generally opposite from the rear lower arm 58d, and the front lower arm 58b extends generally opposite from the rear upper arm 58c. The front upper arm 58a may extend further forward than the front lower arm 58b. The rear lower arm 58d may extend further rearward than the rear upper arm 58c.

The cross brace 46 accordingly has four ends 60 that may attach to the four attachment points 30 of the door module 16. The four ends 60 include fastening structure, which is spaced apart in a manner than corresponds to the spacing of the attachment points 30 on the door module. The fastening structure may be in the form of through-holes of the like that may receive fasteners that engage the ends 60 of the cross brace 46 and the attachment points 30 of the door module 12. It will be appreciated that the cross brace 46 may have other shapes with additional attachment points 30 or fewer attachment points 30.

The hinge module 14 can move between a closed position, in which the supported door module 12 is in the closed position against the vehicle body, and an open position, in which the door module 12 is disposed away from and disengaged from the vehicle body. The closed position of the hinge module 14 is shown in FIG. 1.

To move from the closed position toward the open position, the arms 42 and 44 may be pivoted relative to the hinge bracket 40. The outer ends of the arms 42 and 44 will move outwardly along an arc-shaped path corresponding to the radius defined between the pivot point on the hinge bracket 40 and the pivot point at the cross brace 46. The radius of curvature for each of the outer ends of the arms 42 and 44 is approximately the same, based on the same approximate longitudinal distance between the respective pivot points at opposite ends of the arms 42 and 44.

However, due to the offset of the pivot points at the hinge bracket 40, the outer ends of the arms 42 and 44 will move relatively closer to each as they pivot away from the closed position, and will become vertically aligned at the point that the radiuses intersect. The door module 12 will open in accordance with the movement of the cross brace 46, based on the attachment between the door panel 16 and the cross brace 46.

Figure 2:
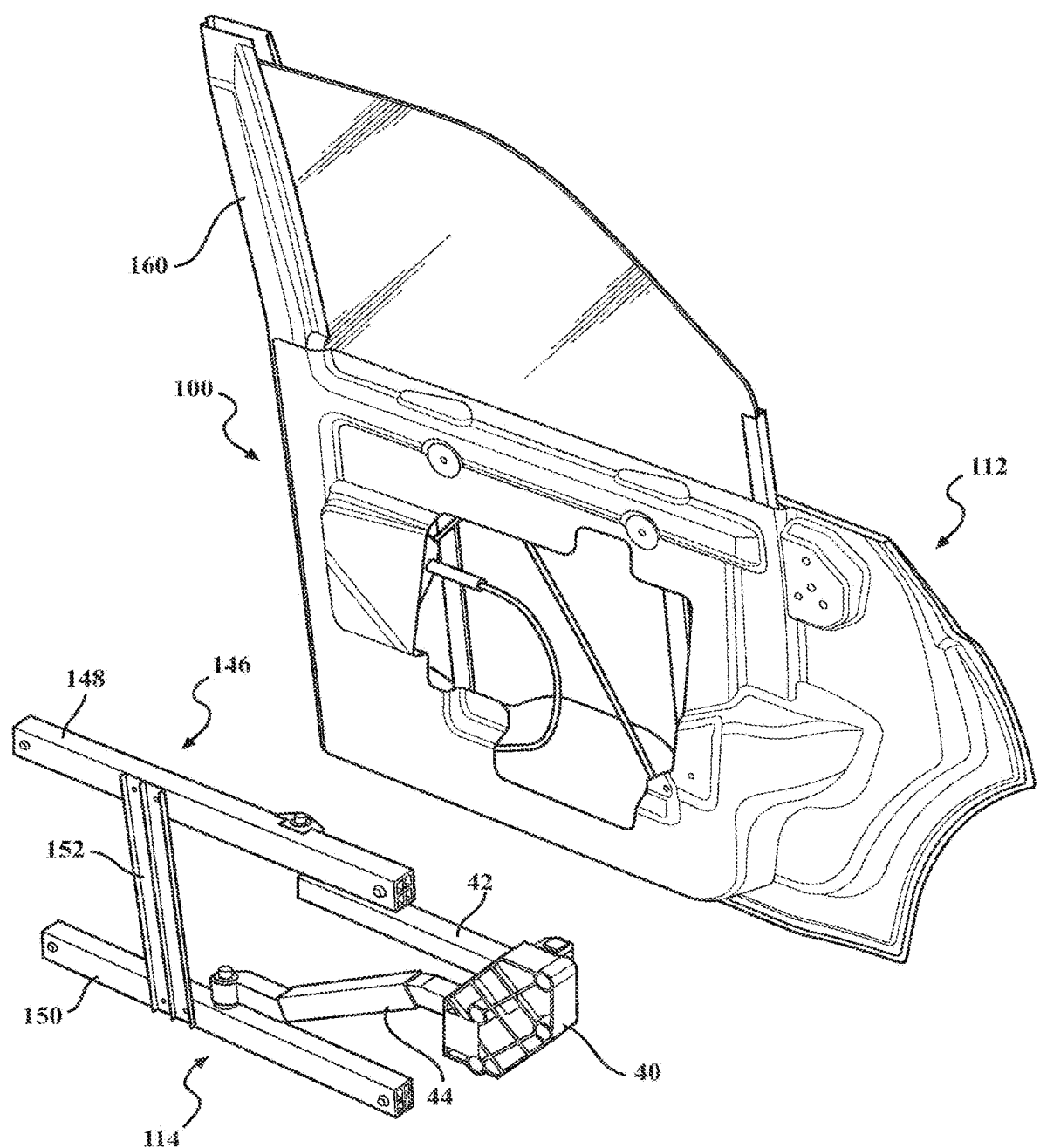
FIG. 2 is an exploded perspective view of a second vehicle door, illustrating an alternative brace that joins the hinge module to the door structure.

Turning now to FIG. 2, a door module 112 and hinge module 114 are illustrated. Features of the door module 112 and the hinge module 114 may also be applied to the door module 12 and hinge module 14, unless otherwise noted. In particular, the I-brace 146 may be used with the door module 12, and the structural reinforcement of door module 112 illustrated in FIG. 2 may also be used in the door module 12.

The door module 112 and hinge module 114 are illustrated as a "rear" version. Thus, the door module 12 and the door module 112 may be mated with each other at an interface 100, which is disposed at the rear of a front door and the front of a rear door. The interface 100 is arranged to allow either the front door or the rear door to be operated and opened independently relative to the other.

The hinge module 114 may include the I-brace 146, which operates similarly to the cross brace 46, in that it is attached to the arms 42 and 44, which attach to the bracket 40, and the bracket 40 is attached to the vehicle body. The I-brace includes an upper rail 148 and a lower rail 150, each of which are pivotally attached to the corresponding arms 42 and 44, similar to hinge module 14. The upper and lower rails 148 and 150 extend generally horizontally and parallel to each other, and may be approximately the same length.

The upper rail 148 is attached to the lower rail via a connector plate 152. The connector plate 152 extends generally vertically between the upper rail 148 and the lower rail 150. In the "rear" version, the connector plate 152 is disposed forward relative to the pivot connections of the arms 42, 44. The upper and lower ends of the connector plate 152 may be attached to upper and lower rails 148, 150 in a manner known in the art, such as via fasteners, welding, or other robust bonding method.

The upper and lower rails 148, 150 may have a square shaped cross-section or U-shaped cross-section. The connector plate 152 may have a generally flat cross-section. The upper and lower rails 148 and 150 and the connector plate 152 may therefore combine to define a robust unit in the form of the I-brace 146 that may be attached to the door module 12 in a robust and rigid manner, as shown in FIG. 3.

The upper rail 148 is disposed above the upper arm 42, and the lower rail 150 is disposed below the lower arm 44. Thus, then door module 12 is opened and the arms 42, 44 pivot relative to the bracket 40, the arms 42, 44 may pivot relative to the I-brace 146 without interfering with the upper and lower rails 148, 150.

The I-brace 146 has been shown and described with reference to FIGS. 2 and 3, but it will be appreciated that the I-brace 146 are related structure may also be used with the door module 12 shown in FIG. 1.

Figure 3:
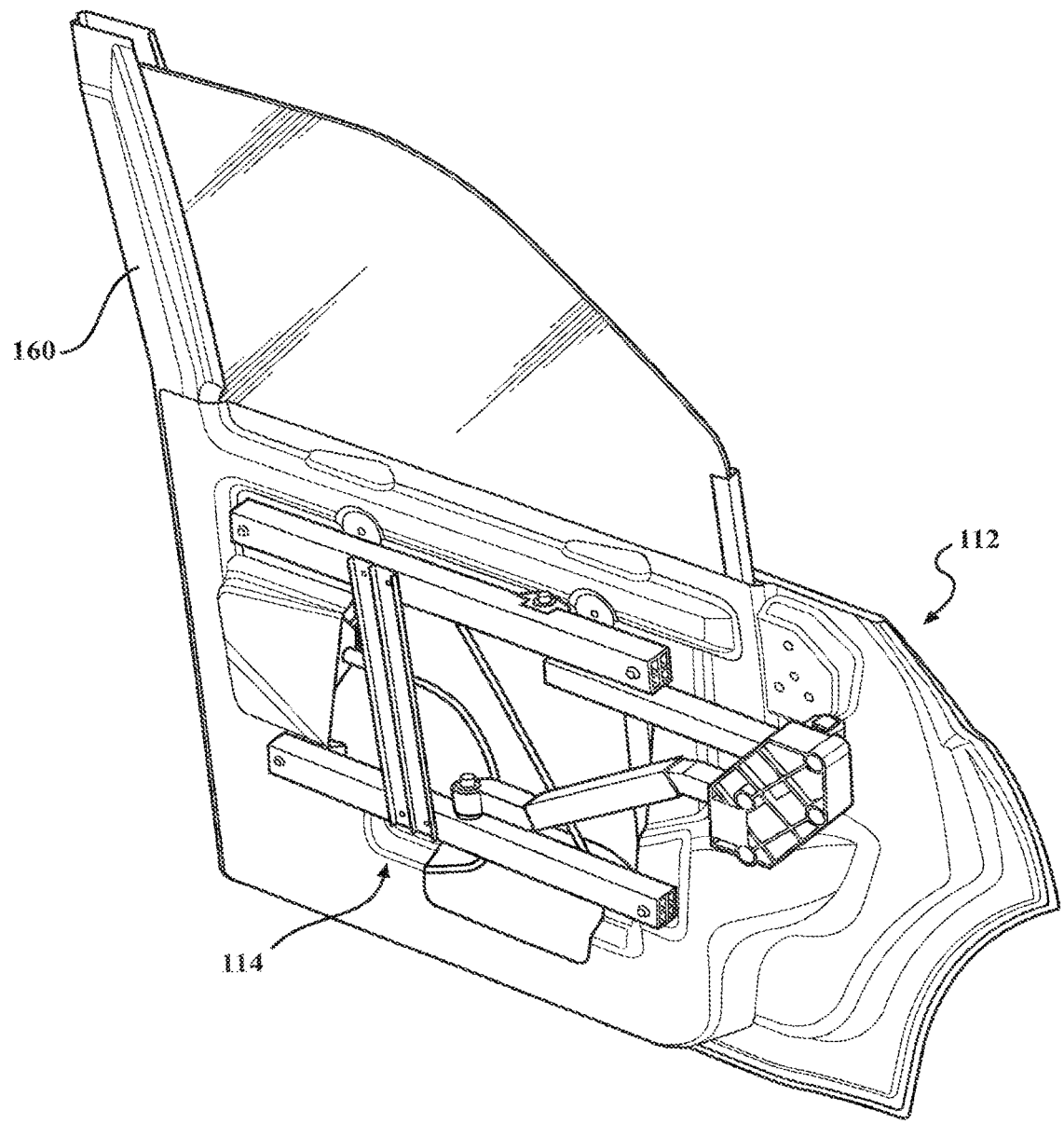
FIG. 3 is a perspective view of the second vehicle door, illustrating the brace and the door structure in an assembled state.

The door module 112 shown in FIGS. 2 and 3 further includes additional reinforcing support structure relative to a traditional vehicle door or closure panel. In particular, the door module 112 includes an embedded pillar 160 disposed at the front edge of the illustrated "rear" version of the door module 112. The embedded pillar 160 provides for additional support for the door module 112 in the absence of a traditional B-pillar of the vehicle body that is typically disposed at the front of a rear door. The embedded pillar 160 may similarly be disposed at the rear edge of a front door. Put another way, the embedded pillar 160 is disposed at the interface 100 of both the front and rear door of a pair of doors embodying the disclosed system 10. The inclusion of the embedded pillar 160 allows for the exclusion of pillar structure on the vehicle body, thereby creating a larger overall door opening when the doors are opened. The embedded pillar 160 provides rigidity to the vehicle when the doors are closed that is resistant to impact and other loads.

Figure 4:
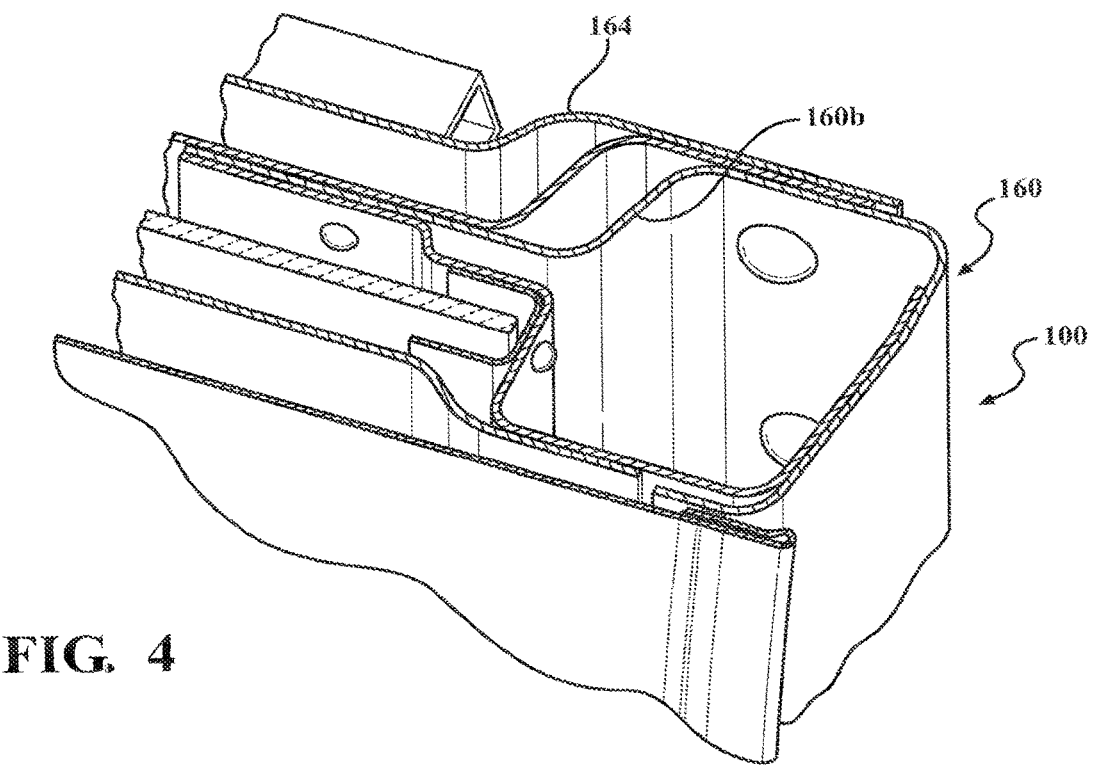
FIG. 4 is fragmentary cross-sectional perspective view illustrating a reinforcement structure at an interface location between doors.
Figure 5:
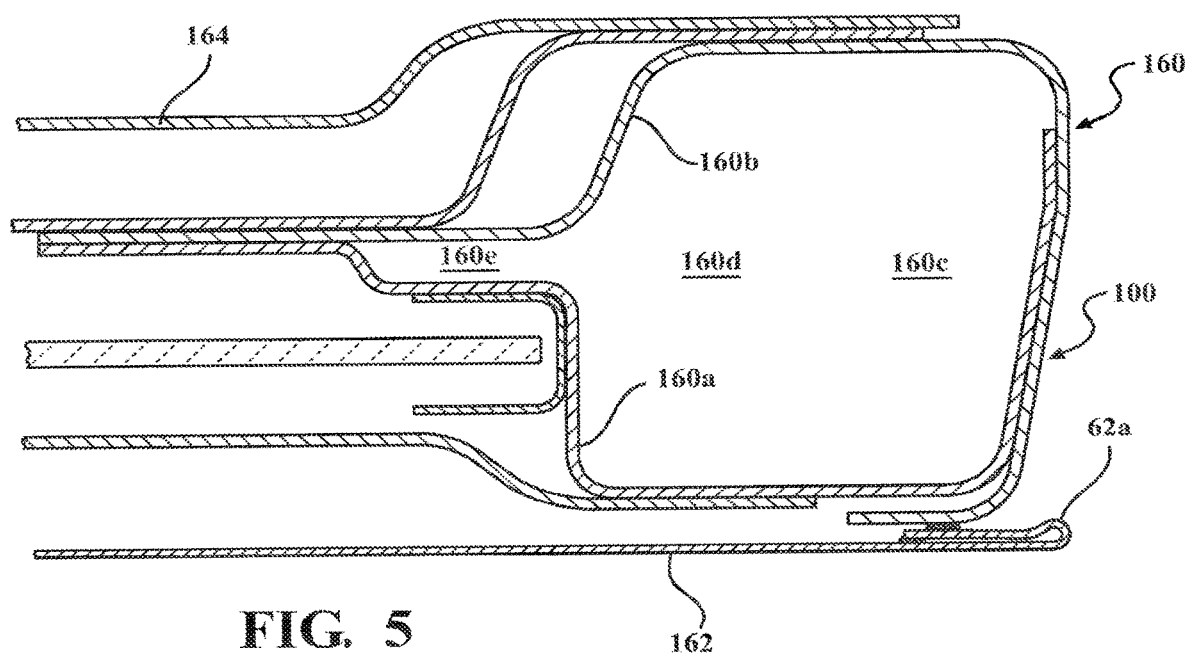
FIG. 5 is a cross-sectional plan view illustrating the reinforcement structure and door structure at the interface.

The embedded pillar 160 is shown in cross-section in FIGS. 4 and 5. The door module 112 may include an outer sheet 162 that defines the outer facing surface of the door module 112. The outer sheet 162 is disposed outwardly relative to the embedded pillar 160. The outer sheet 162 will typically crumple in response to a collision, as in a typical vehicle door. An inner sheet 164 is also shown in FIGS. 4 and 5, which is disposed on an inner side of the embedded pillar 160. The outer and inner sheets 162 and 164 do not substantially fold over the lateral edge (front or rear depending on the door).

As shown in FIGS. 4 and 5, the outer sheet 162 defines a folded hem flange 162a at the edge. The hem flange 162 is defined by the edge of the sheet 162 being folded over. An inner surface of the hem flange 162 may be attached to the embedded pillar 160 via structural adhesive or single sided welding to join the embedded pillar 160 with the outer sheet 162.

The embedded pillar 160 may be defined by combining a bent outer portion 160a with a bent inner portion 160b. The inner portion 160a and the outer portion 160b may combine to define a closed cross-section defining an inner cavity 160c. The inner portion 160b may wrap around the outer portion 160a, and the inner portion 160b may be the portion that is bonded to the folded hem flange 162a of the outer sheet 162. The inner portion 160b may therefore be disposed closer to the interface 100 than the outer portion 160a when the inner portion 160b is wrapped around the outer portion 160a. The inner cavity 160c may include a front wide portion 160d and a rear narrow portion 160e extending rearward from the wide portion 160d. It will be appreciated that "front" and "rear" may be reversed for the opposite version of the door. Additional door panel sheets or structure may be attached to the embedded pillar 160 and or the outer sheet 162 and inner sheet 164 to define the overall door structure for mounting additional structure thereto.

The outer portion 160a and the inner portion 160b may be attached to each other by a MIG welding process. Of course, other joining methods could be used that are sufficient to securely joint he parts together and withstand a vehicle side impact. The additional door structure may be attached to the embedded pillar 160 by welding, rivets, bonding, adhesives, or the like. The embedded pillar 160 may be made from steel or similar material having similar strength properties. The additional sheets that attached to the embedded pillar may be aluminum or the like.

Thus, the use of the embedded pillar 160 enables the door module 12 or 112 to meet side intrusion requirements for passenger vehicles, even without the use of a traditional B-pillar in the vehicle body. The use of the embedded pillar 160 allows for the door modules 12 or 112 to be paired with an opposite version such that a front and rear door are provided. The interface 100 between front and rear doors, without a B-pillar or latching structure disposed therebetween, allows for the doors to be individually operable relative to each other.

As previously mentioned above, the embedded pillar 160, while shown with reference to FIGS. 2-5, may also be included in the door module 12 shown in FIG. 1.

The above described system 10 allows for the door having the system 10 to be operated independently, due to the front door and the rear door latching to the vehicle body rather than to the other door. The front and rear doors utilizing this system 10 may seal against each other at the interface 100 without a B-pillar. The doors utilizing this system 10 may meet side impact requirements based on structure and safety interlocks with the body.

To assemble the system 10 with the vehicle body, the hinge module 14/114 may typically be installed to the vehicle first, using fixture setting and utilizing slip planes in the fore and aft and up and down directions. The door module 12/112 may then be installed to the hinge module using fixture setting and utilizing slip planes in the fore and aft and up and down directions.

The modular aspects of the hinge module 14 and the door modules 12/112 allow for the different door modules 12/112 to be paired with a previously installed hinge module 14. Accordingly, a variety of different door module types may be designed for use with a common hinge module 14.

Figure 6:
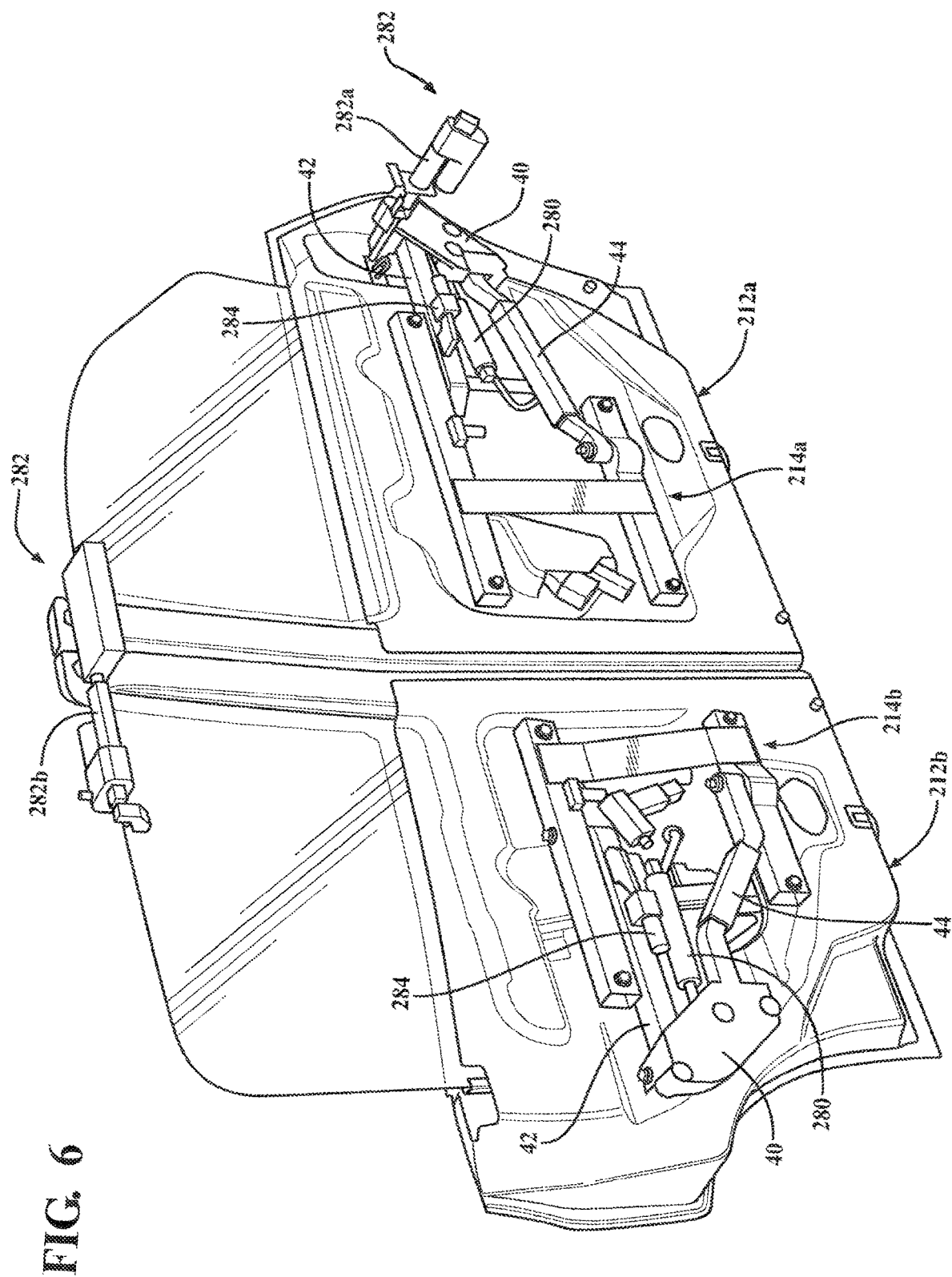
FIG. 6 is a perspective view illustrating two vehicles doors in a closed position.
Figure 7:
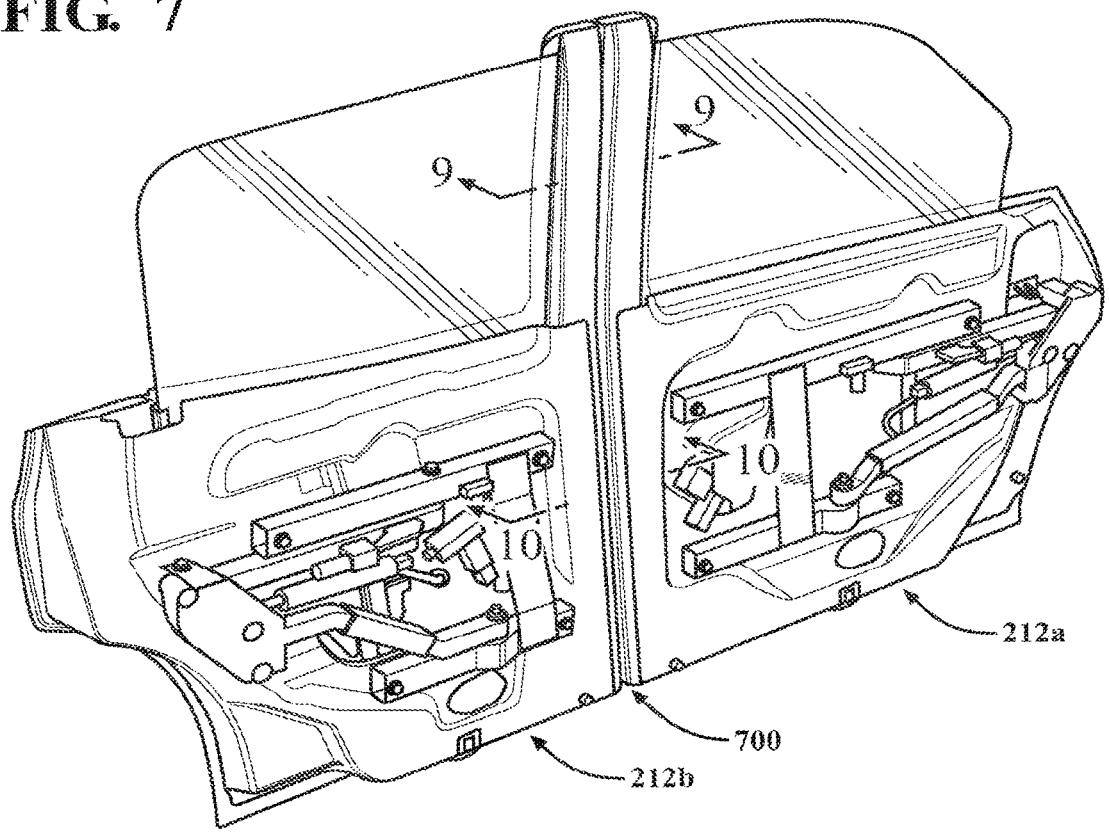
FIG. 7 is another perspective view illustrating two vehicle doors in a closed position.

With reference to FIGS. 6-10, additional aspects of the system 10 are shown. With reference to FIG. 6, both a front door module 212a and a rear door module 212b are shown in a closed position, with corresponding front and rear hinge modules 214a and 214b shown coupled to the door modules 212a, 212b. Unless otherwise noted, the above described features and functionality of the door modules 12, 112 and hinge module 14 may be applied to the door modules 212a and 212b and hinge modules 214a and 214b. Similarly, unless otherwise noted, the features and functionality of further components described with respect to the door modules 212a and 212b and hinge modules 214a and 214b may be applied to the previously described door modules 12, 112 and hinge module 14.

FIG. 6 illustrates the door modules 212a and 212b in the closed position, providing a sealing engagement therebetween. The system 10 may further include front and rear power actuators 280 configured to provide powered opening and closing of the doors. The actuators 280 may be in the form of linear actuators, and may be fixed at each end in a pivotable manner. One end of the actuator 280 may be attached to the hinge bracket 40, and the opposite end may be attached to the upper arm 42 or lower arm 44. Upon actuation and extension of the actuator 280, the hinge modules 214 may be caused to move open and the door module 212a, 212b may open from its closed position. Similarly, upon actuation of the and retraction of the actuator 280, the door module 212a, 212b may close from its open position. The actuator 280 may be included in a pre-installed state on either the door module 212a, 212b or the hinge module 214a, 214b. In another aspect, the actuator 280 may be provided as a separate component.

In one aspect, the system 10 may include cinch mechanisms 282 for both the front door module 212a and the rear door module 212b. In one aspect, a front cinch mechanism 282a may be disposed at a front portion of the front door module 212a near the hinge bracket 40. A central cinch mechanism 282b may be disposed at the top of the front and rear door modules 212a and 212b. The cinch mechanisms 282 are operable to pull the door modules 212a and 212b fully closed after the latch mechanism 26 disposed on the bottom of the doors is engaged. The central cinch mechanism 282b may be configured to cinch the doors together, and the front cinch mechanism 282a may be configured to cinch and pull the doors to the vehicle body.

In one aspect, the system 10 may include latch mechanisms 284 associated with each of the actuators 280. The latch mechanisms 284 may be configured to lock when the door modules 212a, 212b are in the open position, thereby prohibiting the door modules 212a, 212b from closing and/or moving to prevent contact with other areas of the vehicle when they are in the open position. The latch mechanisms 284 may be configured to lock after the power actuators 280 have opened the door, and may be further configured to disengage prior to actuating the actuators 280 to close the doors.

The actuators 280, cinch mechanisms 282, and latch mechanisms 284 may each be operatively connected to a controller or the like that is configured to send signals for operating each of these components to automatically open, lock in place, and close the doors in response to corresponding associated command signals.

Turning now to FIGS. 7-10, the sealing mechanism 700 is illustrated with respect to the door modules 212a, 212b. In one aspect, the sealing mechanism 700 may be disposed on only one of the doors 212a or 212b, with the opposite door configured to engage with the sealing mechanism 700 when closed.

In one aspect, the sealing mechanism may include a first seal member 702 extending generally vertically along substantially the entire height of the door-to-door interface. The sealing mechanism 700 may further include second and third seal members 704, 706, which combine to extend vertically along substantially the entire height of the door-to-door interface. The first seal member 702 may be disposed on the inboard portion of the interface, and the second and third seal members 704, 706 may be disposed on the outboard side of the sealing interface. Accordingly, at virtually any vertical location along the interface, two seal members are disposed in the direction of the vehicle interior, providing a redundancy.

The first seal member 702 may have a box-like cross-section, with elongated cavities extending substantially the entire length of the seal member 702. Thus, in response to a force exerted on the seal member, the seal member 702 may flex in response. The seal member 702 may be made of a flexible and resilient material, such as rubber.

The second and third seal members 704, 706 may have a fin-like or lip-like shape. The second seal member 704 may be disposed above the third seal member 706, and may be disposed along the portion of the door that defines the window opening. The second seal member may have a curved shape to define a loop, and the second seal member may be disposed between a pair of inwardly extending flanges of the door structure.

The third seal member 706 may be disposed along a lower portion of the door below the window opening. The third seal member 706 may have an L-shape or the like, and may extend between the doors such that it spans the opening between opposing hem flanges of the door modules 212a, 212b. When one of the doors open, the seal mechanism 700 will either remain in place or move with the door that opens. When the doors are brought back together, the seal mechanism 700 will re-engage the opposite door.

Figure 11:
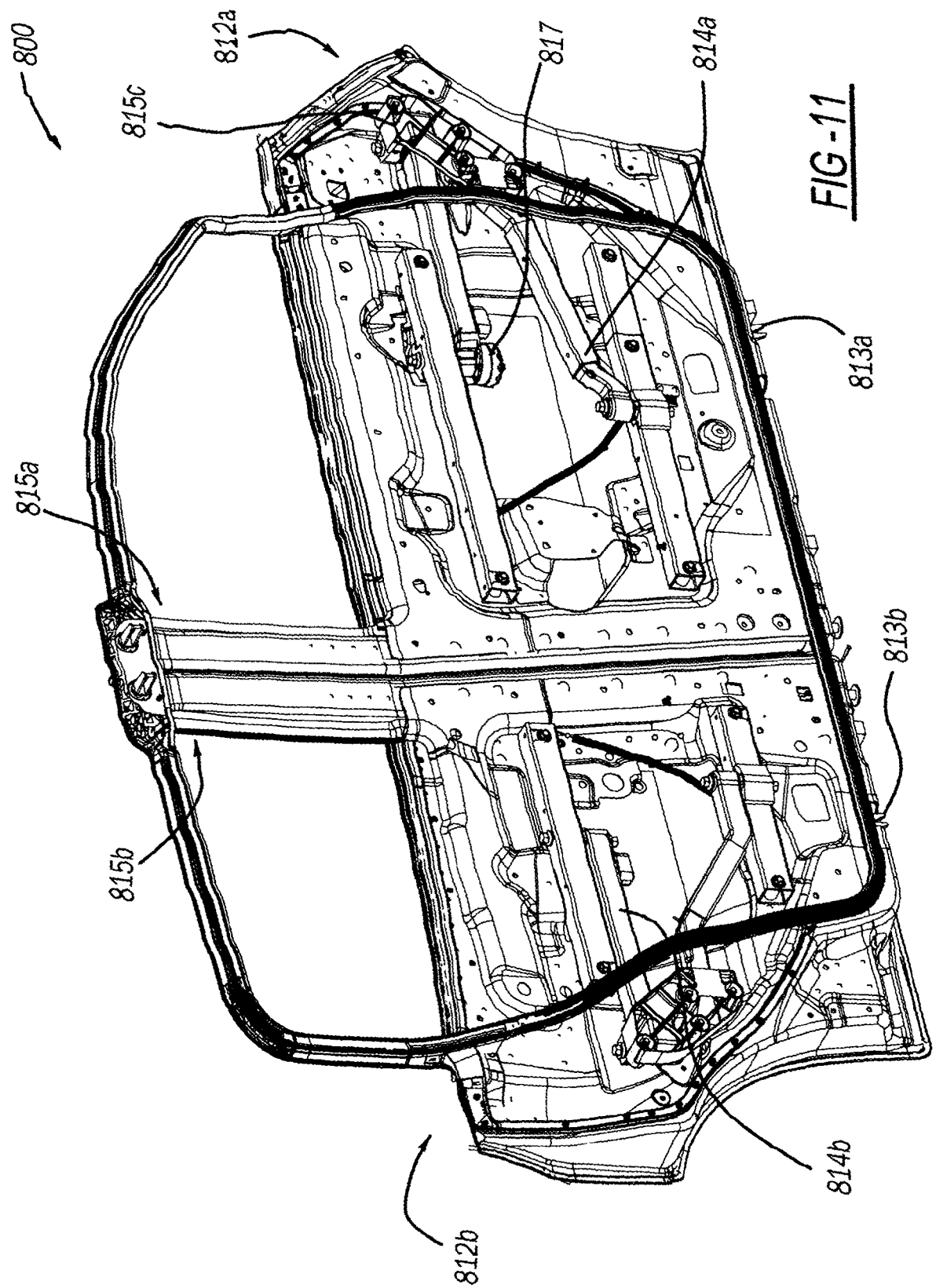
FIG. 11 is a perspective view of illustrating two door modules, two hinge modules, a door check mechanism, a door presenter, primary latch mechanisms, and secondary latch mechanism, with the doors in a closed position according to an aspect of the disclosure.

Turning now to FIG. 11, in another aspect, modular door system 800 is illustrated. The system 800 includes many of the same aspects and benefits as described above, and may include any of the above aspects described above not explicitly discussed herein with reference to system 800.

System 800 includes door modules 812a and 812b. Each door module 812a, 812b is pivotable about a front or rear hinge structure, as previously described. The door modules 812a, 812b meet at a central B-pillar location in a sealed manner, as described above.

The door module 812a includes a primary door latch 813a disposed at a bottom edge of the door module 812a. The primary door latch 813a is configured to interact with the vehicle body, in particular the bottom edge of the vehicle body that defines the opening in the vehicle body for ingress and egress and passengers. Door module 812b similarly includes primary door latch 813b disposed at a bottom edge thereof, which operates similarly to the primary door latch 813a of door module 812a.

System 800 further includes secondary latching mechanisms 815a, 815b, and 815c. First secondary latching mechanism 815a is disposed at the top of the B-pillar of door module 812a. Second secondary latching mechanism 815b is disposed at the top of the b-pillar of door module 812b. The first and second secondary latch mechanisms 815a, 815b are therefore disposed adjacent each other when the door modules 812a, 812b are in the closed position. Third secondary latch module 815c is disposed at the front hinge area (front A-pillar area) of door module 812a.

As described above, hinge modules 814a and 814b are attached to door module 812a and 812b at a plurality of attachment points. The door modules 812a and 812b are actuatable by corresponding actuators, such as a linear actuator, spindle, or the like. The door modules 812a, 812b may be pre-assembled with window regulators, glass, channels, etc. in a pre-painted state for attachment with the hinge modules 814a, 814b in a manner described previously herein.

System 800 may further include a magnetic door check mechanism 817 installed on one or both of the door modules 812a, 812b. As shown in FIG. 11, magnetic door check mechanism 817 is installed on door module 812a. The magnetic door check mechanism 817 will be described in further detail below.

Figure 12:
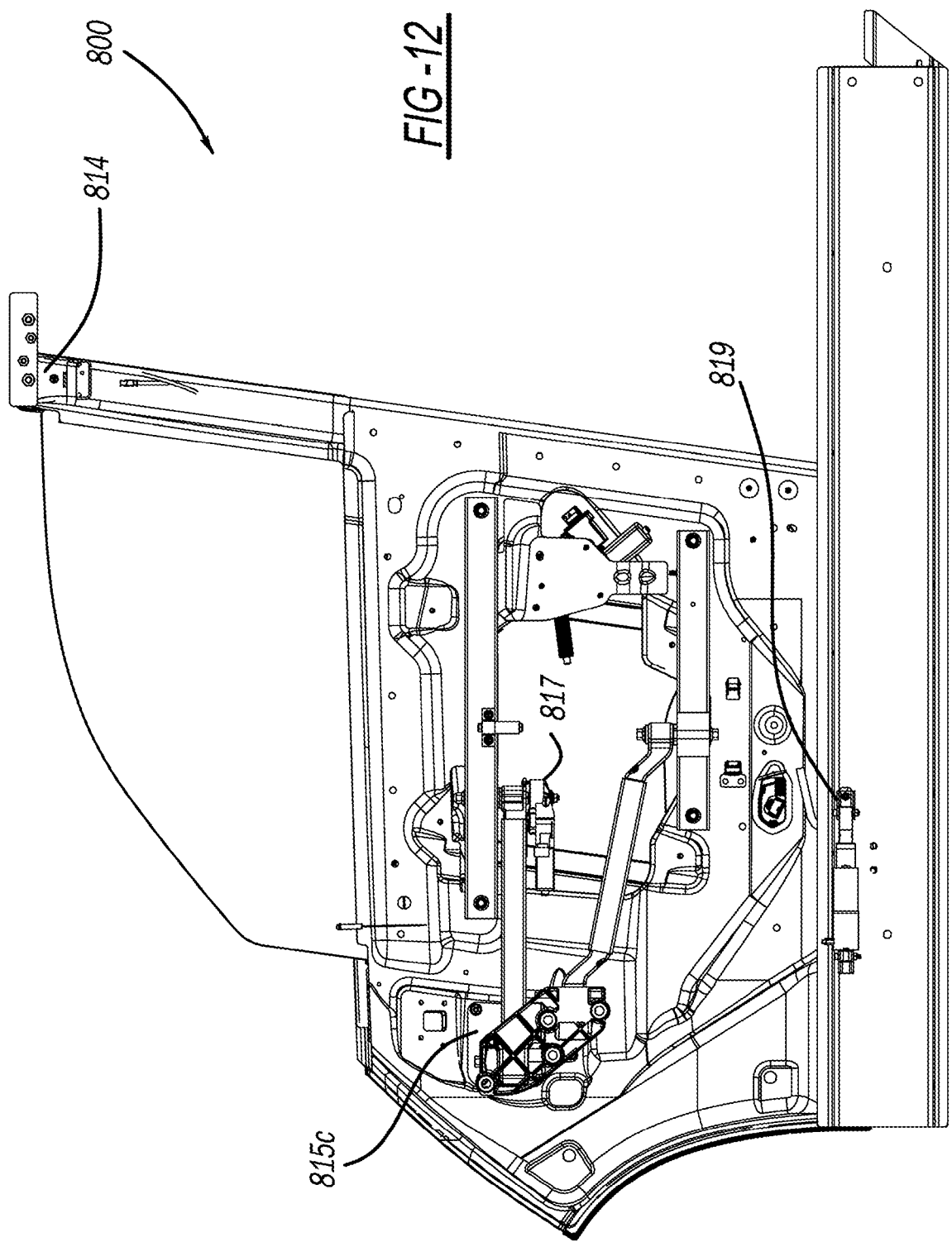
FIG. 12 is a further view of vehicle door illustrating the location of secondary latch mechanism, the door check mechanism, and the door presenter, according to an aspect of the disclosure.

With reference now to FIG. 12, system 800 may further include door presenter mechanism 819 disposed at a bottom edge of the door module 812a. FIG. 12 further illustrates that secondary latch mechanisms 815a, 815c (B-pillar and a-pillar locations) may have a common design. This common design provides for ease of installation and operation, which will be described in further detail below.

Figure 13:
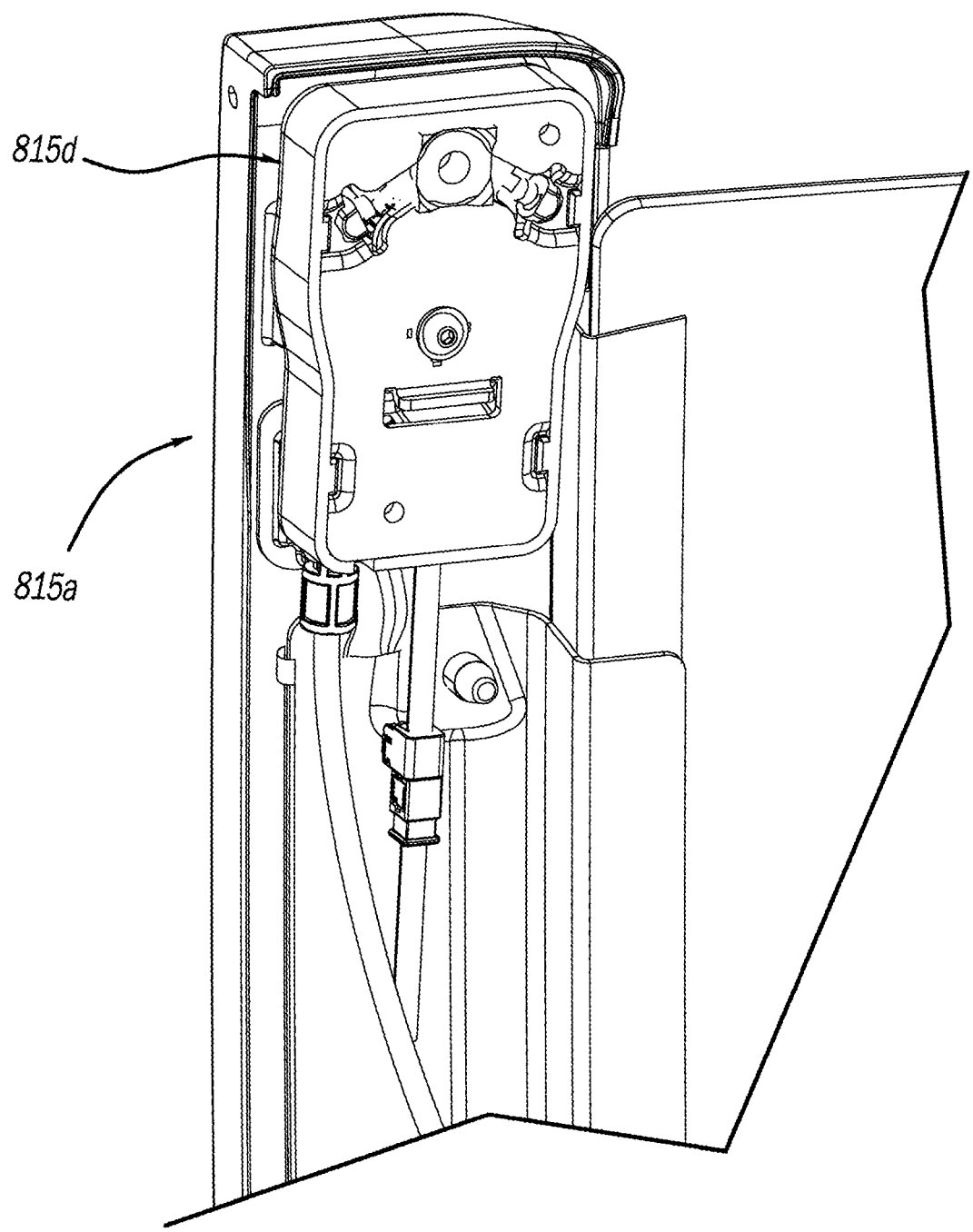
FIG. 13 is a perspective view of the secondary latch mechanism mounted to a B-pillar of a vehicle door according to an aspect of the disclosure.

FIG. 13 illustrates additional detail regarding the secondary latch mechanisms. For purposes of discussion, secondary latch mechanism 815a will be described, with the details being applicable to each secondary latch mechanism. The secondary latch mechanism 815a has a compact packaging arrangement that makes installation at the top of the b-pillar possible. The secondary latch mechanism 815a is primarily actuatable via a powered mechanism, and further includes mechanical release mechanism as a backup.

The secondary latch mechanism 815a may be operable without the use of cinch mechanism according to an aspect of this disclosure. The omission of a cinch mechanism is possible due to an improved alignment of the door with the vehicle body.

As described previously in this disclosure, the door modules 812a, 812b are independently operable. The secondary latch mechanisms 815a, 815b are therefore independently operable. Actuating one to release the corresponding door module can be performed without actuating or opening the other door module.

Figure 14:
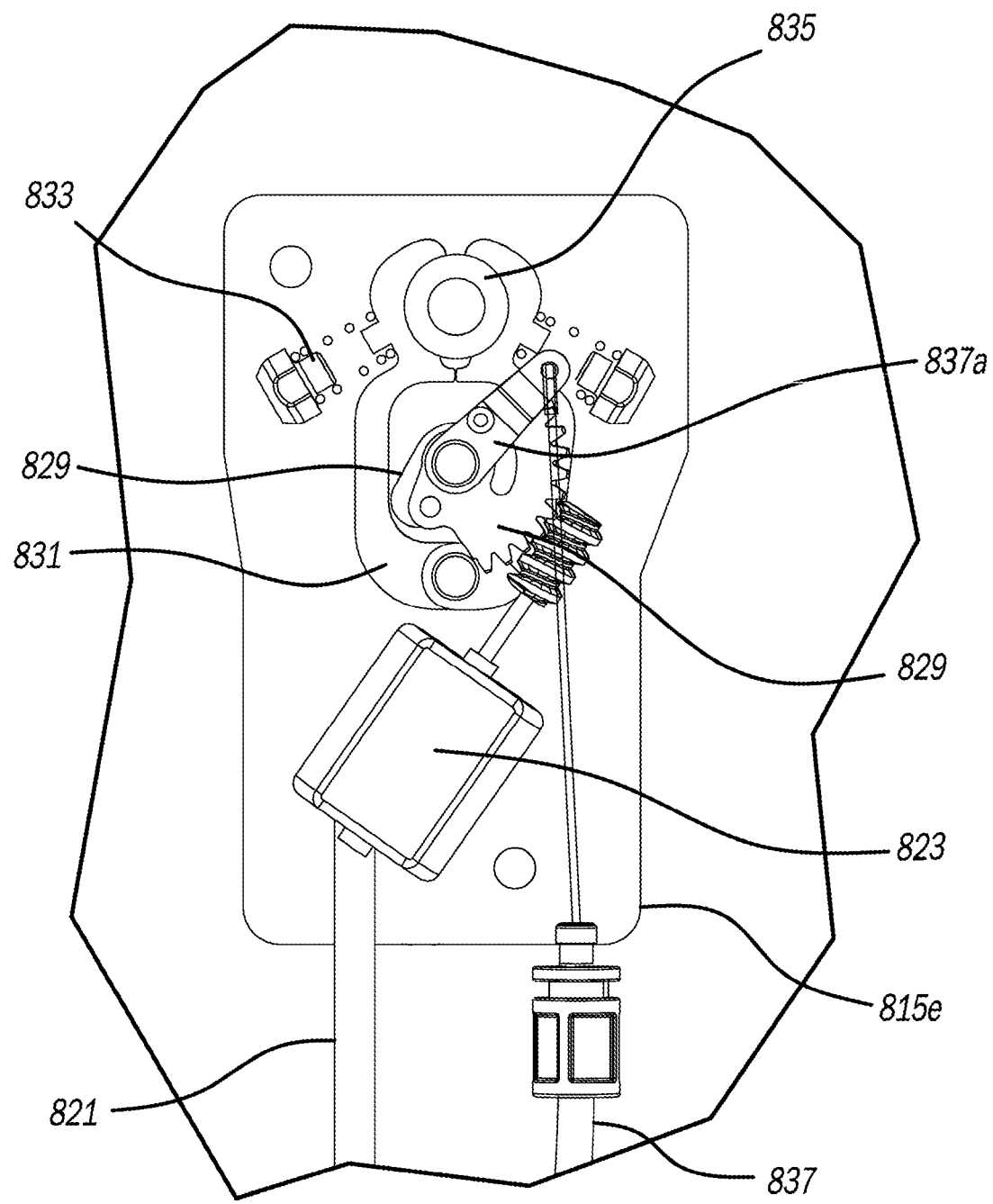
FIG. 14 is a front view of the secondary latch mechanism.

As shown in FIGS. 13-14, secondary latch mechanism 815a includes a protective cover 815d, within which the components of the latch mechanism are stored. The protective cover 815d generally defines the packaging size of the latch mechanism 815a, and may be attached to a mounting plate 815e of the latch mechanism 815a. Mounting plate 815e is attachable to the b-pillar, as described in further detail below.

Latch mechanism 815a further includes a powered released cable 821, which provides power to a powered release actuator 823 (such as a motor). The actuator 823 is operable to cause rotational movement of a shaft, which rotates a gear 829 attached thereto (such as a worm gear or the like). The worm gear 829 is in meshed engagement with a cam mechanism 829, which operates on a self-centering pawl 831, described in further detail below. Compression springs 833 act on the self-centering pawl 831 to bias the pawl 831 to a closed position that engages a body-mounted striker pin 835. Body mounted striker pin 835 includes a tapered head portion operable to force the pawl 831 open in a closing direction, but to be prevented from being retracted in a door-opening direction without the pawl 831 being actuated to an open position.

Latch mechanism 813 further includes a mechanical backup release cable 837, which mechanically pulls on the cam mechanism 829 via lever 837a to open the pawl 831 and release the striker pin 835.

Figure 15:
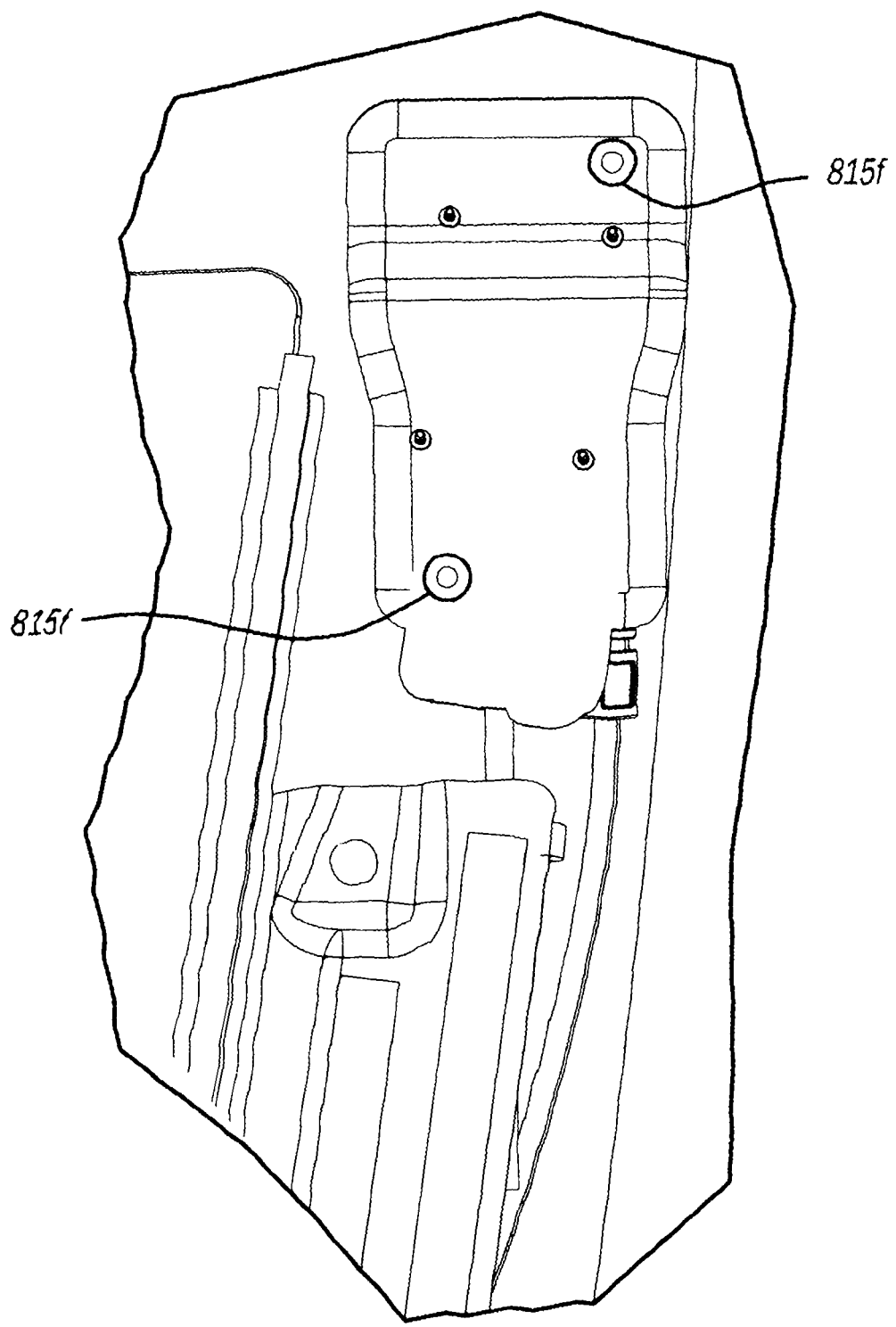
FIG. 15 is rear view of the secondary latch mechanism illustrating oversized mounting holes of the latch mounting surface for X and Z axis adjustment.
Figure 16:
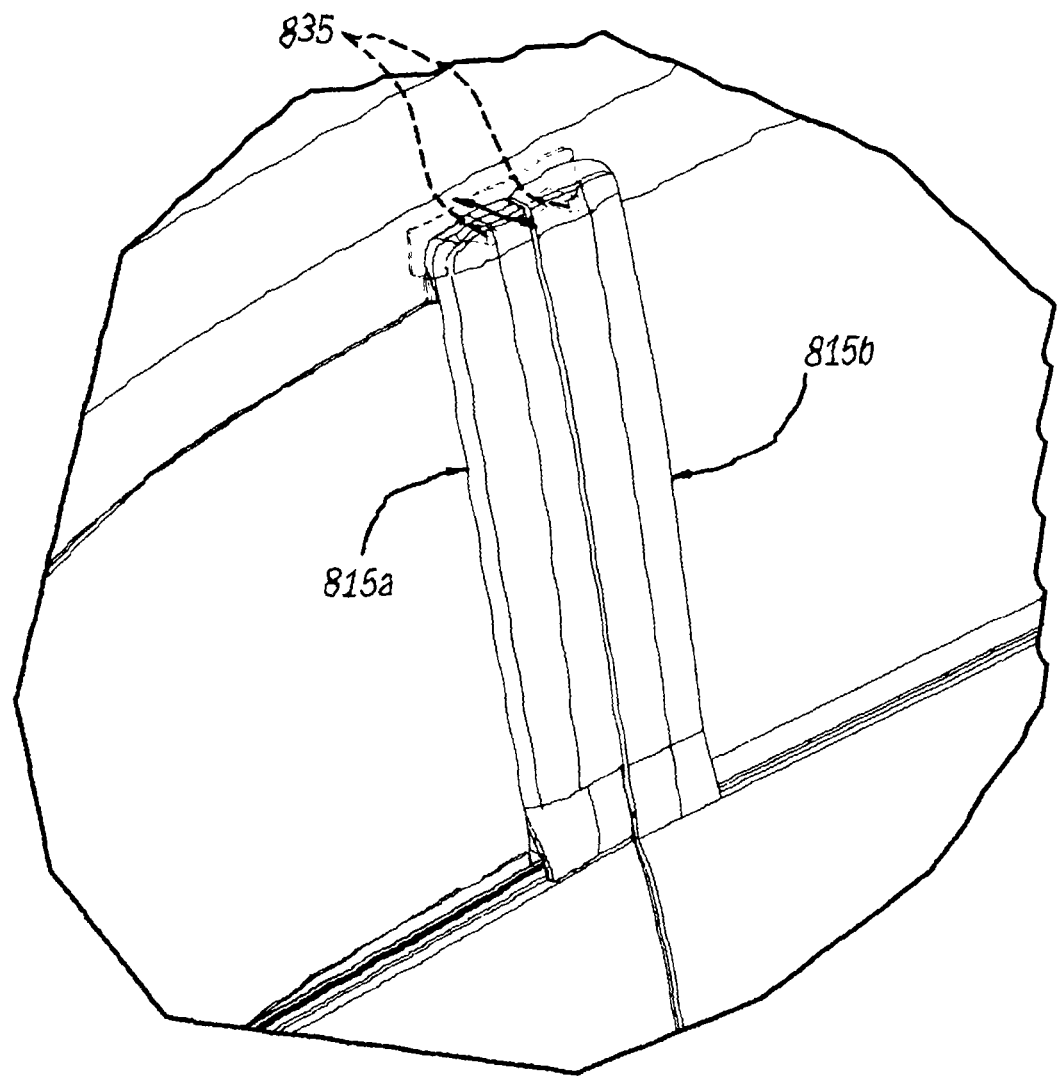
FIG. 16 is a perspective view illustrating Y-axis adjustment for a striker pin of the secondary latch mechanism.

The mounting plate 815e is adjustable relative to the vehicle body and the body-mounted pin 835. As shown in FIG. 15, the mounting plate 815e includes oversized mounting holes 815f, thereby allowing adjustment in the X and Z axis. Additionally, the striker pin 835 is adjustable in the Y-direction, as shown in FIG. 16. Accordingly, build variations of the vehicle body and the door modules 812a, 812b can be accommodated via normal operation.

Figure 17:
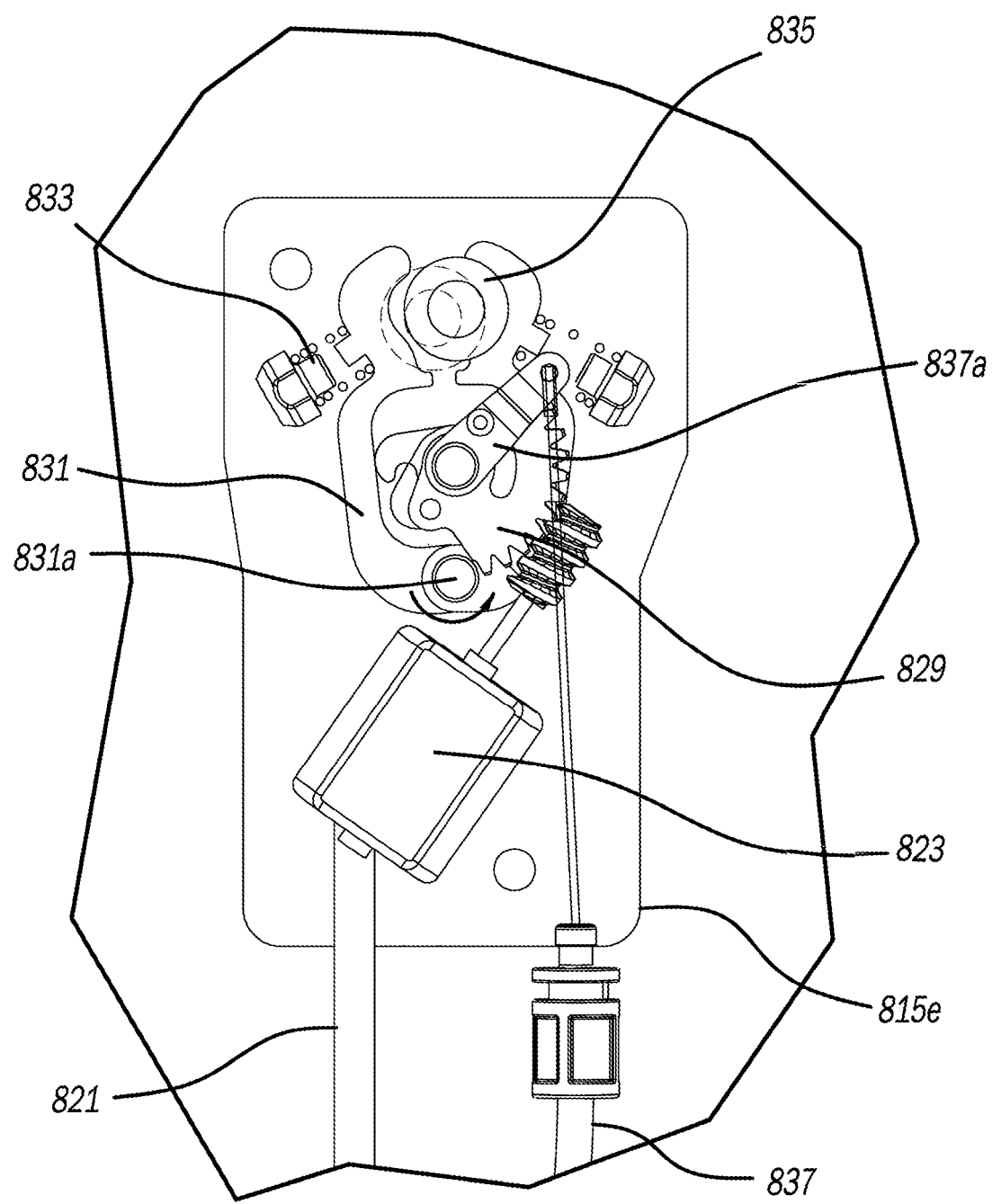
FIG. 17 illustrates a misaligned secondary latch mechanism and pivoting pawl accommodating the misalignment.
Figure 18:
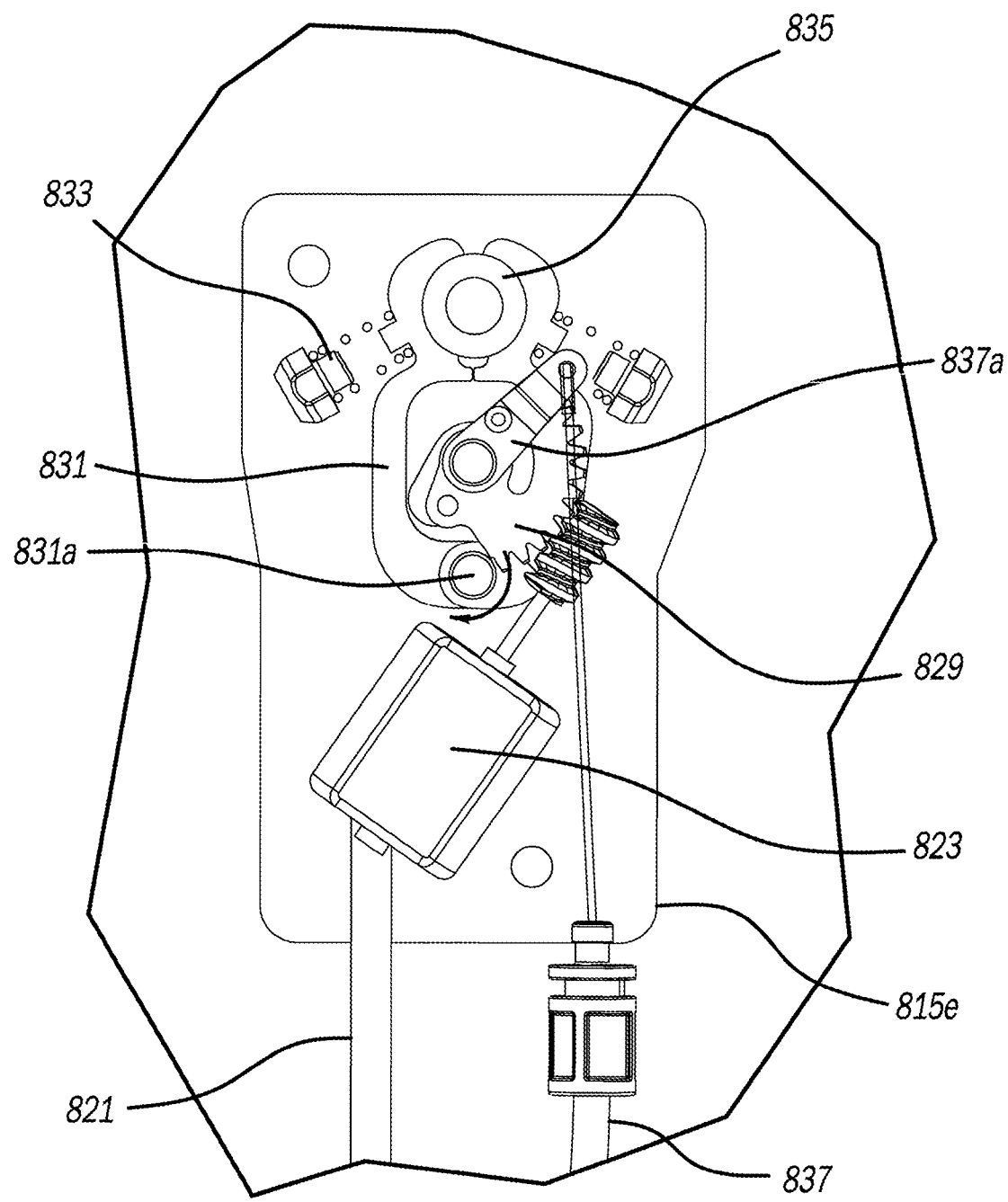
FIG. 18 illustrates the secondary latch mechanism after latching following the misalignment of FIG. 17.

As shown in FIGS. 17 and 18, the self-centering pawl 831 accommodates misalignments between the latch mechanism 815a and the striker pin 835. The pawl 831 is mounted to the mounting plate 815e via a pivot axis 831a, allowing the pawl 831 to pivot relative to the mounting plate 815e. The compression springs 833 that bias the pawl 831 toward pin 835 will keep the pawl engaged with the pin 835 even when the pawl 831 is pivoted relative to the pivot axis 831a. Thus, with the striker 835 not yet engaged with the pawl 831, the striker 835 may be misaligned. Upon contact with the pawl 831 in a door closing operation, the pin 835 may contact the pawl 831 in an offset position, as shown in FIG. 17. In doing so, the pawl 831 will pivot about the axis 831a, and the compression spring 833 on one side will be compressed, with the compression spring 833 on the other side applying pressure on the pawl 831 into engagement with the pin 835.

After latching is complete, the compression springs 833 will equalize, causing the mounting plate 815e to shift such that the pawl 831 is centered on the pin 835 and the compression springs 833 are at approximately the same position. Thus, the pivoting of the pawl 831 occurs during the door closing operation, but resets to a neutral position once the door closes. The pawl 831 may be released upon actuation via the powered actuator or the mechanical backup mechanism 837.

The above process may be used at various locations of the vehicle body relative to the door module, as shown in the figures, with the operation being the same, thereby improving efficiency of installation. When located on each B-pillar, the door modules 812a, 812b may be opened independently, with each remained latched and secured to the vehicle body even if the other door module is open.

Figure 19:
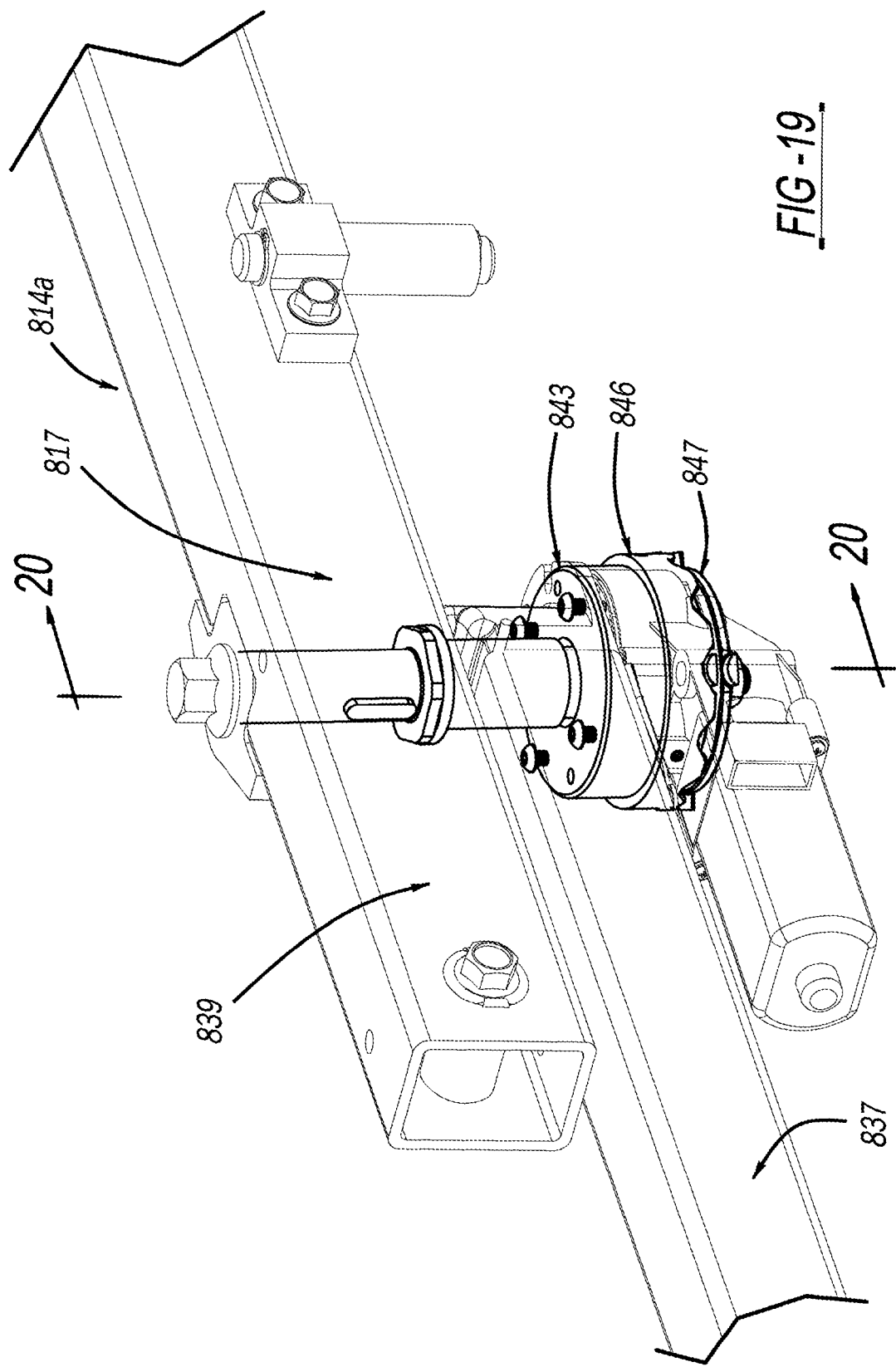
FIG. 19 is a perspective view of the door check mechanism between an upper and lower hinge bar of the hinge module.
Figure 20:
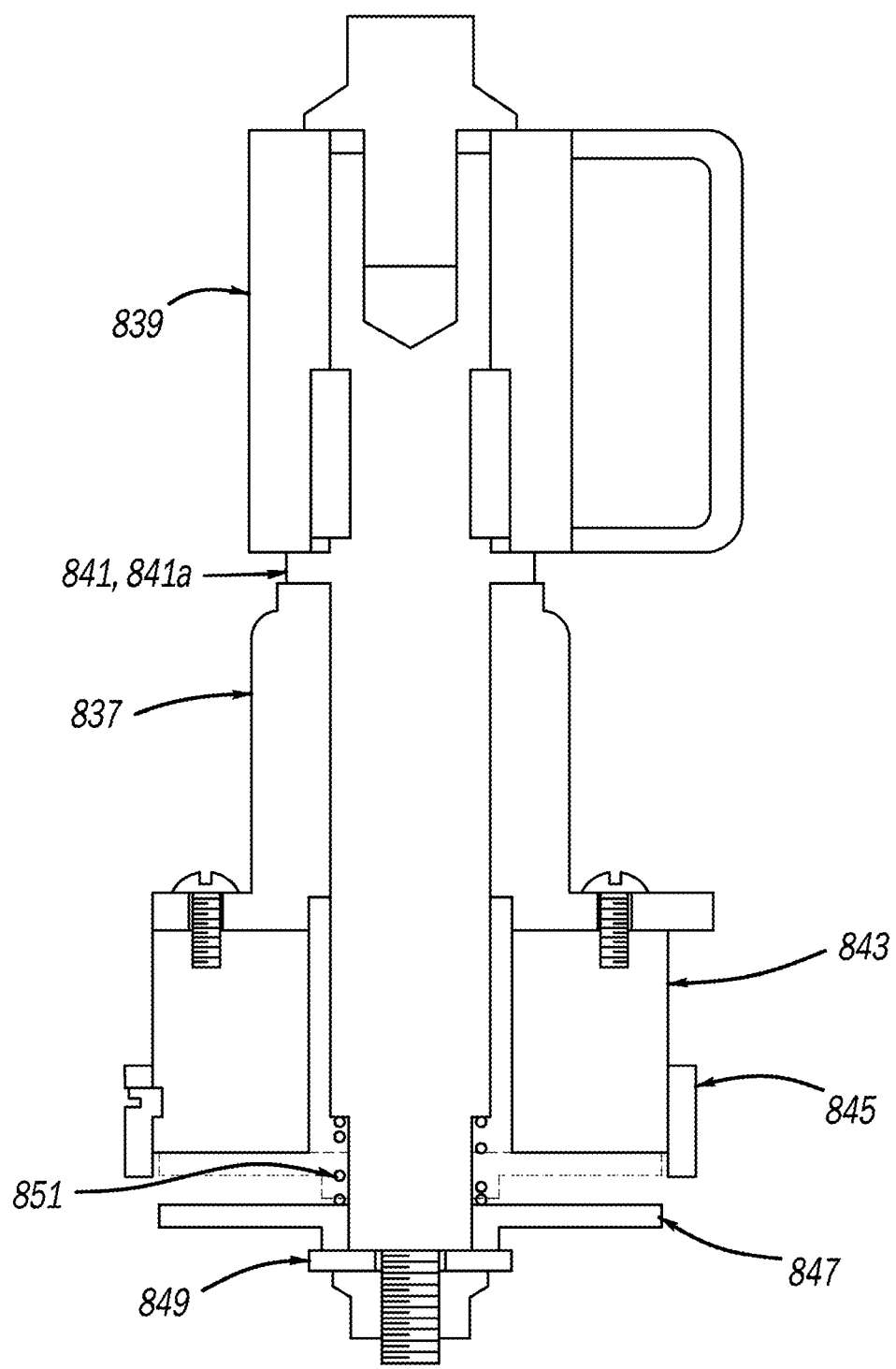
FIG. 20 is a cross-sectional view of the door check mechanism.

With reference to FIGS. 19 and 20, door check mechanism 817 is shown in further detail. Door check mechanism is also shown in FIG. 11 installed in relation to door module 812a. The door check mechanism 817 includes a mechanism similar to a dog clutch to hold the door module 812a in a variety of positions within the range of travel of the door module 812a. it will be appreciated that the door check mechanism 817 may additionally or alternatively be installed on door module 812b.

The door check mechanism 817 is installed on the hinge module 814a. Hinge module 814a includes lower hinge bar 837 and upper hinge bar 839, each of which are part of the upper portion of hinge module 814a, which pivot or rotate relative to each other when the door module 812a moves to an open position. The relative movement of the upper and lower hinge bars 837 and 839 can be controlled or held in place via the door check mechanism 817, thereby controlling and holding the door module 812a (attached to the upper hinge bar 839) in place.

Hinge pin 841 extends generally vertically and extends between the lower hinge bar 837 and the upper hinge bar 839. In one aspect, the hinge pin 841 is fixed to the upper hinge bar 839. Hinge pin 841 may include an annular flange 841a that is disposed axially between the upper and lower hinge bars 837, 839, which may act as a bearing surface or the like.

A permanent magnet 843 is fixed to a bottom surface or bottom flange of the lower hinge bar 837. The permanent magnet 843 may have a ring shape and surround the hinge pin 841, which extends axially through the permanent magnet 843. A ring bracket 845 is fixed to the bottom of the magnet 843, and includes a plurality of downwardly extending teeth at the outer perimeter of the ring bracket 845.

A steel plate 847 is slidably installed on the bottom of the hinge pin 841, and is actuatable between a closed position and an open position. The steel plate 847 includes a plurality of notches sized and arranged to receive the teeth of the ring bracket 845. A stop 849 is fixed to the bottom of the hinge pin 841 to retain the steel plate 847 and stop the sliding travel of the steel plate 847. Disc spring 851 is disposed radially within the magnet 843 is biased against the steel plate 847 to bias the steel plate 847 away from the ring bracket 845. The steel plate 847 is rotationally fixed relative to the hinge pin 841.

In the closed position, the steel plate 847 is engaged with the teeth of the ring bracket 845, such that the upper hinge bar 839 cannot pivot relative to the lower hinge bar 837, because the steel plate 847 is engaged with the ring plate 845, which is fixed to magnet 843, with is fixed to lower hinge bar 837. The magnetic forces of the magnet 843 draw the steel plate 847 upward and into engagement with the ring bracket 845.

In the open position, the steel plate 847 is shifted downward and away from the magnet 843 and the ring bracket 845, thereby permitting the lower hinge bar 837 to move relative to the hinge pin 841 and steel plate 847, and therefore also the upper hinge bar 839.

To move the steel plate 847 to the open position, the magnetic flux to the permanent magnet 843 is reversed by supplying power to the magnet 843, which repels the steel plate 847 away from the magnet 843. With no power applied, the steel plate 847 will be drawn back against the magnet 843 and to the closed positon to lock the hinge bars 837 and 839 relative to each other.

Thus, when power is applied, the door module 812a may open a certain distance until power is not applied, at which point the steel plate 847 will shift and close the clutch-type mechanism and lock the door module 812a and hinge module 814a in place.

FIG. 20 illustrates the open position of the steel plate 847 in solid line. The closed position of steel plate 847 is shown in dashed line.

Figure 21:
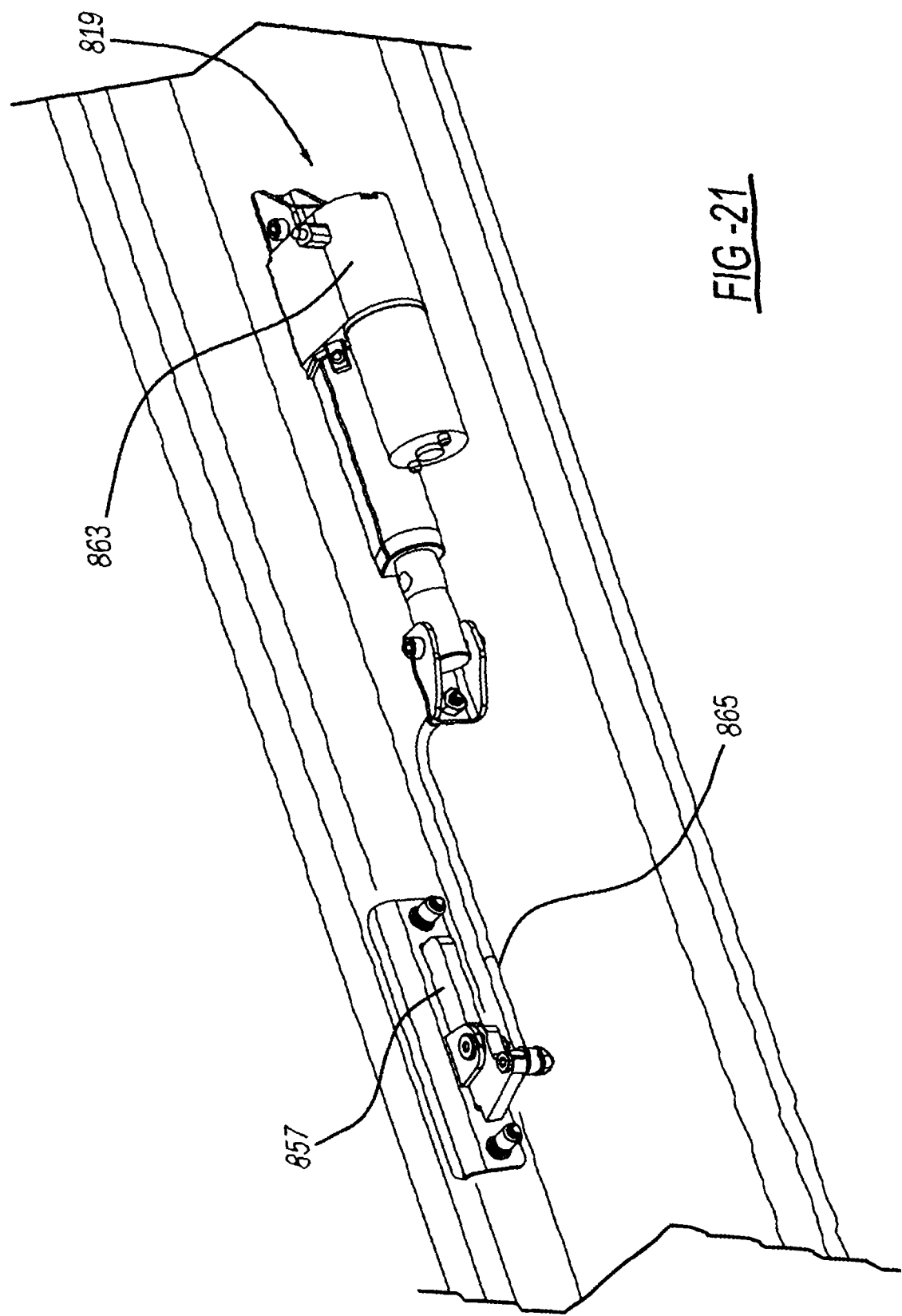
FIG. 21 is a perspective view of the door presenter with a pawl in the closed position.
Figure 22:
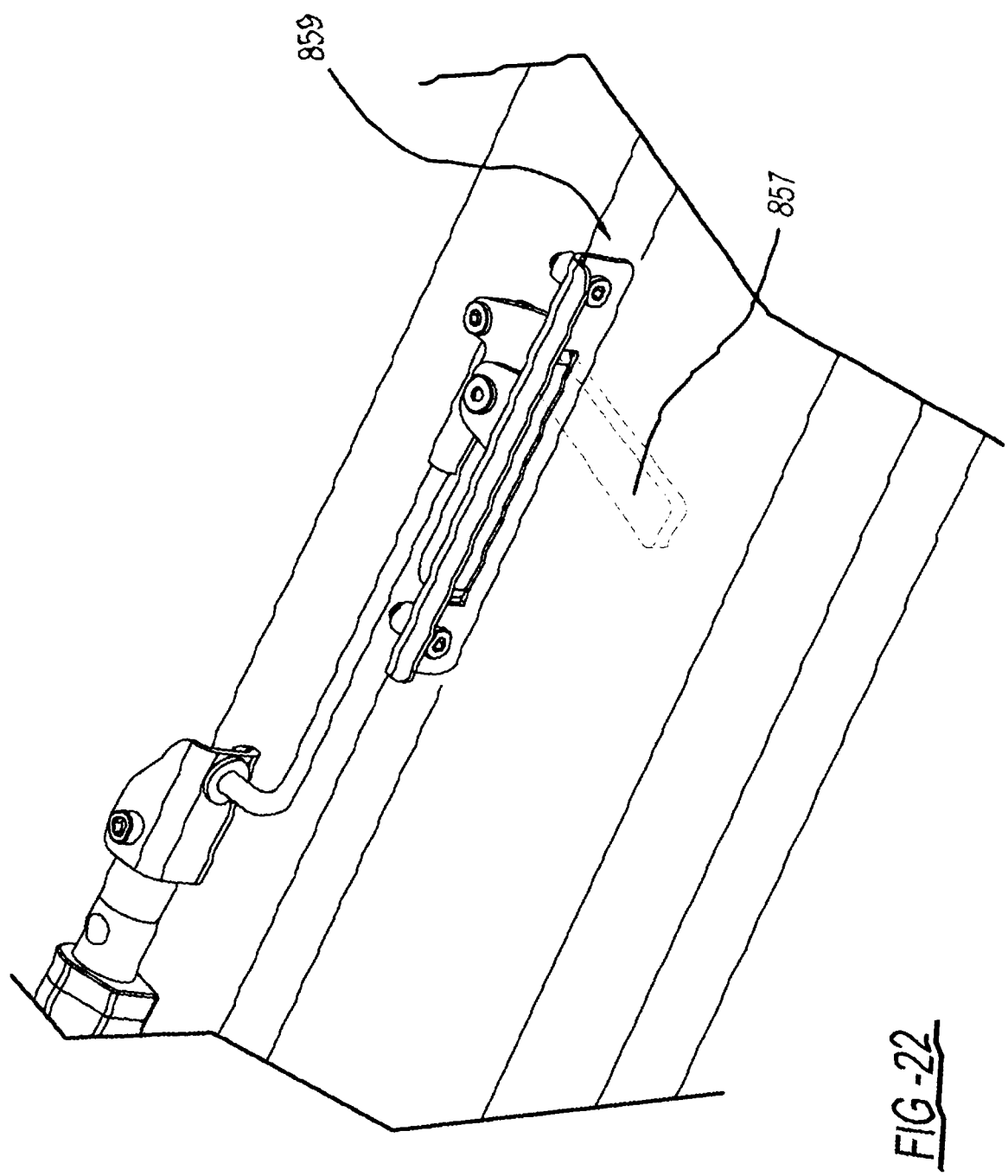
FIG. 22 is another perspective view of the door presenter with the pawl in the open position.
Figure 23:
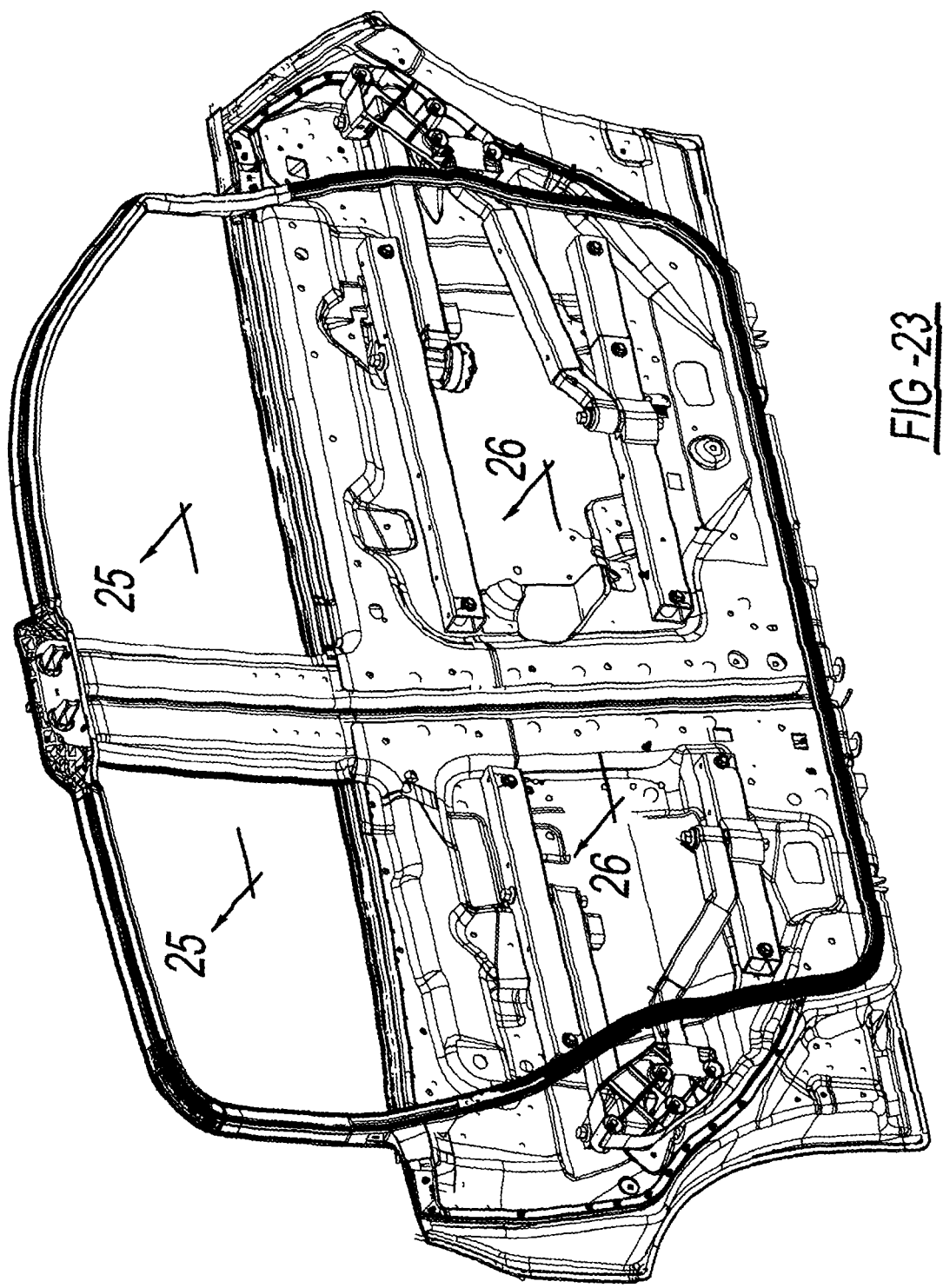
FIG. 23 is a perspective view of two vehicle doors in a sealed arrangement.
Figure 24:
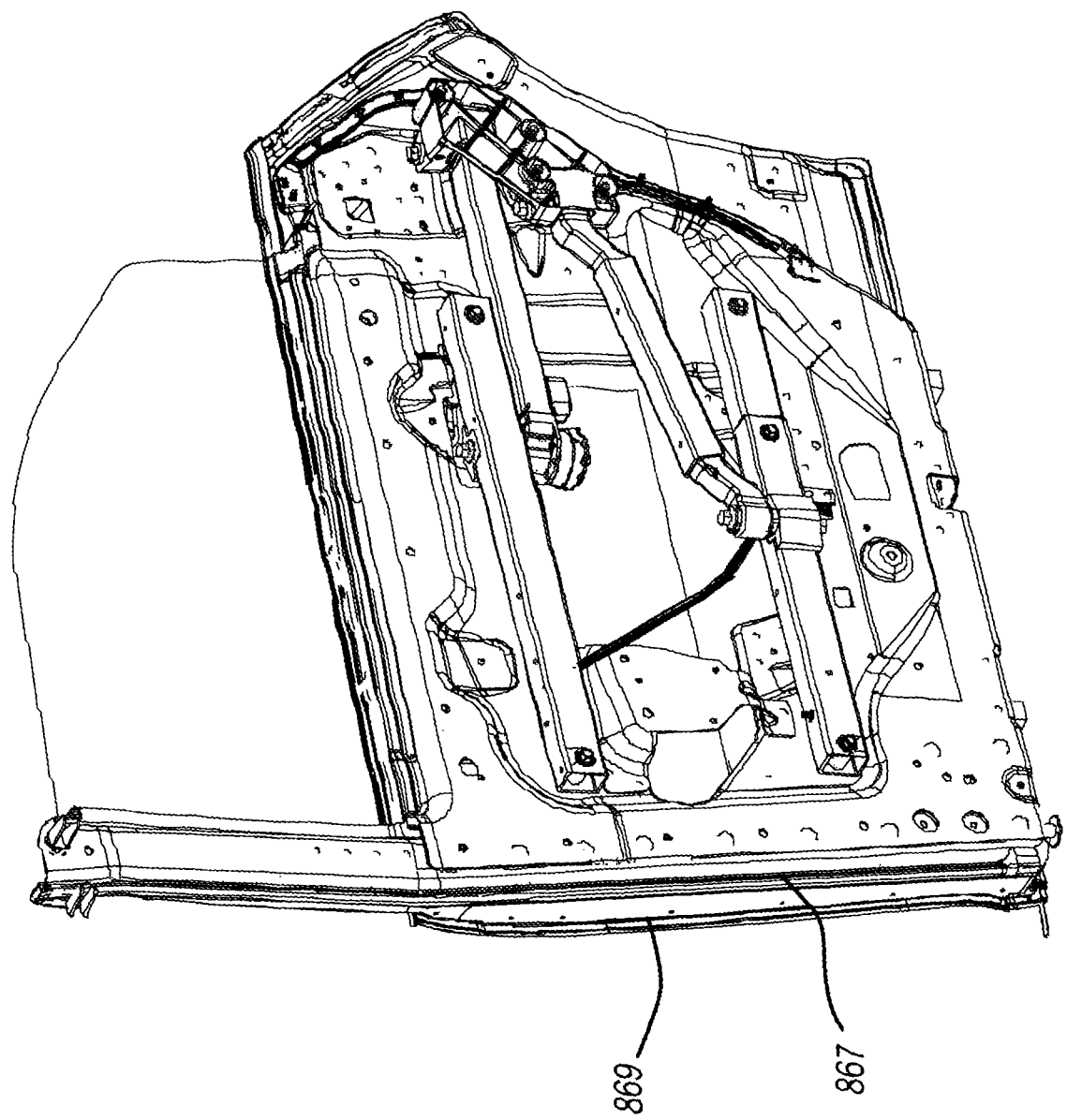
FIG. 24 illustrates a primary and second seal disposed on only one of the two doors.
Figure 25:
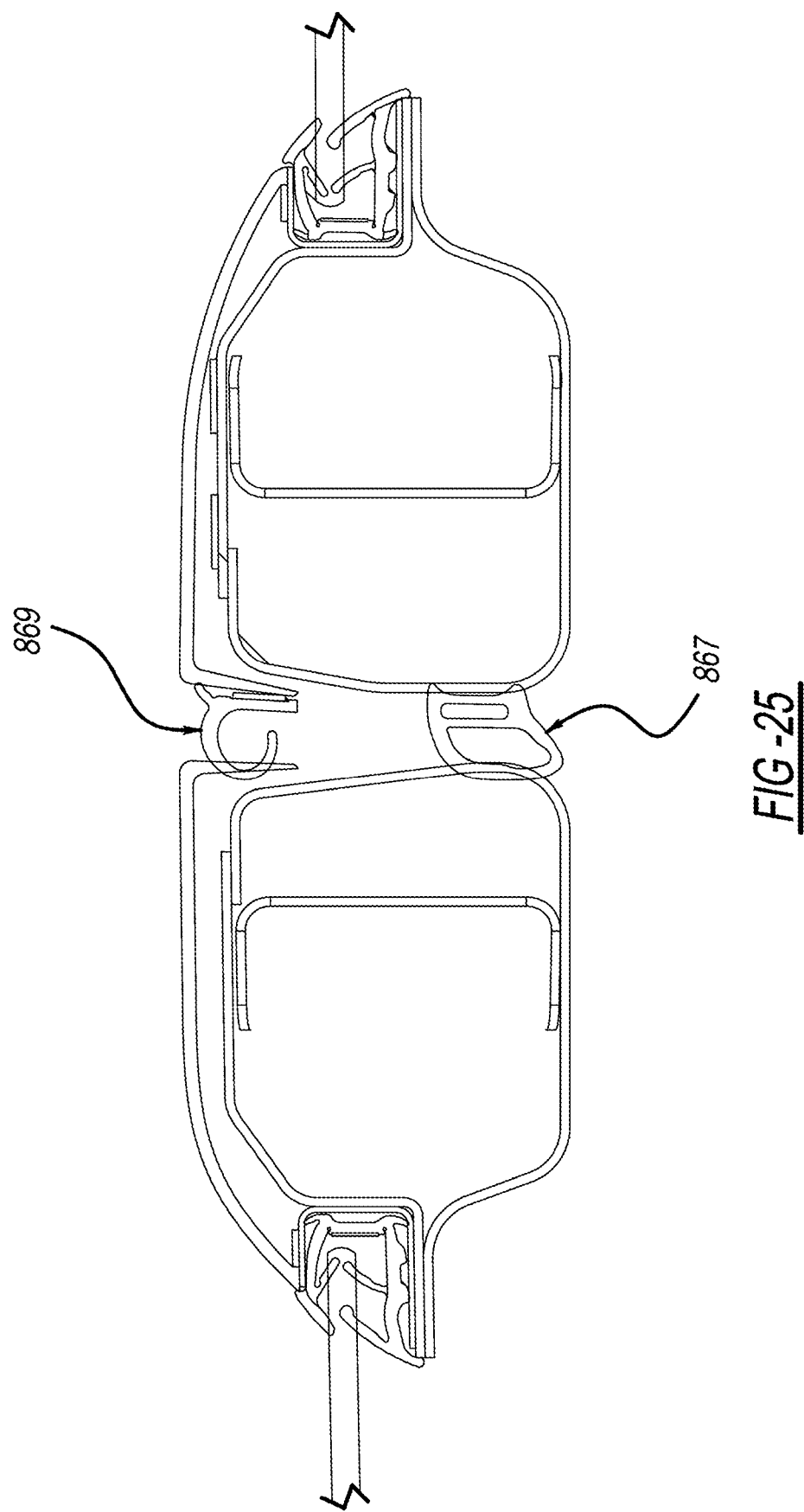
FIG. 25 is a cross-sectional view illustrating the seal members in an upper portion of the sealing arrangement.
Figure 26:
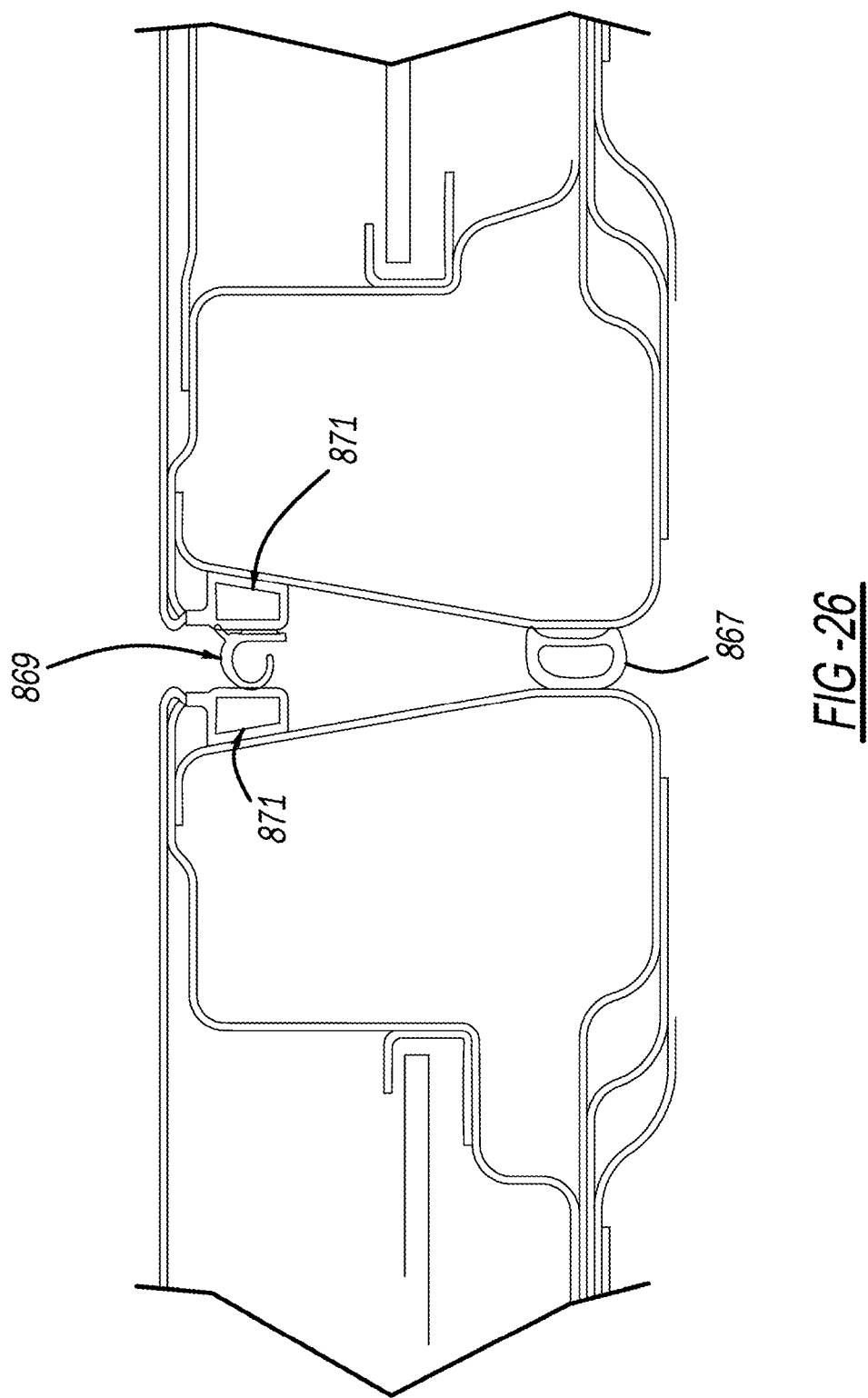
FIG. 26 is a cross-section view illustrating the seal members in a lower portion of the sealing arrangement and including filler pieces between the doors and the secondary seal.

With reference to FIGS. 21 and 22, door presenter mechanism 819 is shown in further detail, including both a closed position and an open position. Door presenter mechanism 819 is used to push the door module 812a (and/or door module 812b) open a predefined distance to assist the door module 812a opening and to avoid interference with surrounding components.

In one aspect, a pawl 857 is pivotally mounted to a bracket 859. The bracket may be mounted to a side sill 861 of the vehicle body. The door presenter mechanism 819 may further include a power actuator 863 and a linkage 865. The linkage 865 extends from the actuator 863 to the pawl 857. Upon actuation, the actuator 863 may pull on the linkage 865, which pulls on the pawl 857, causing the pawl 857 to pivot relative to the bracket 859 and apply an outward force to the door module 812a to push the door open a predefined distance.

With reference now to FIG. 23-26, another aspect of a sealing arrangement between the door modules 812a, 812b. The sealing arrangement described with reference to door modules 812a, 812b may also be applied to other door modules described herein. Similarly, aspects of the sealing arrangements described previously may be applied to door modules 812a, 812b, unless in conflict.

In one aspect, the spacing between adjacent door modules 812a, 812b varies depending on the vertical position along the interface between door modules 812a, 812b. For example, at an outer portion of the interface, along the B-pillar and in the area of the door where the window is present (when the window is in the closed position), the spacing of the interface between door modules 812a, 812b may be smaller than at lower portion of the interface. At an inner portion of the interface, the spacing may be approximately the same.

In one aspect, a primary seal 867 extends vertically along the interface between the modules 812a, 812b on the inner portion of the interface, due to the spacing between modules being approximately the same. The primary seal 867 may extends substantially along the entire length of the modules 812a, 812b. Put another way, the same seal 867 is present in both the upper portion and lower portion of the interface.

In one aspect, a secondary seal 869 also extends vertically along the interface between the modules on the outer portion of the interface. However, at the outer portion, due to the spacing between modules being greater on the lower portion of the interface relative to the upper portion, the sealing arrangement may also include filler pieces 871 applied to the door modules 812*a*, 812*b*, such that the spacing between the modules is approximately the same at both the upper and lower portion, and the secondary seal 869 may extend along both the upper and lower portions of the interface. This provides an alternative to using a larger seal member at the lower portion of the interface and smaller seal and the upper portion of the interface.

In one aspect, both the primary seal 867 and secondary seal 869 are applied to the same door module (either 812*a* or 812*b*). Applying the seals to the same door module may be desirable such that either door module may be opened independently without one seal member interfering with the other during opening and closing.

In one aspect, multiple primary seal members 867 and secondary seal members 869 may be used, having generally the same cross-sectional size and shape, and may be combined to generally defined a continuous seal along the combined length of the seal members.

Thus, the use of filler pieces 871 provides for the use of constant cross-section seal members even in the case of different structure at different vertical locations along the interface.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for opening and closing a door relative to a vehicle body, the system comprising:
   first and second vehicle doors, each of the first and second vehicle doors including:
   a hinge module configured for being mounted to the vehicle body;
   a door module configured for being mounted to the hinge module and further configured for closing a door opening defined by the vehicle body, wherein the door module includes an embedded pillar structure disposed at a front or rear edge thereof;
   a latch mechanism disposed on the door module and configured to engage a striker pin projecting from the vehicle body, the latch mechanism comprising:
   a mounting plate configured for attachment to the pillar structure;
   a pawl pivotally attached to the mounting plate and pivotable about a pivot axis;
   compression springs attached to opposite sides of the pawl biasing the pawl to a nominal closed position;
   wherein misaligned entry of the striker pin pivots the pawl about the pivot axis from a nominal position to a shifted position and, following insertion of the striker pin, the pawl returns to the nominal position and the mounting plate shifts relative to the pillar structure.

2. The system of claim 1, wherein the pawl includes a first portion and a second portion, the first and second portions pivotable outward about the pivot axis in response to insertion of the striker pin.

3. The system of claim 2, wherein the compression springs are attached to each of the first and second portions of the pawl and bias the first and second portions into a closed position.

4. The system of claim 1, wherein the latch mechanism is releasable via a power actuator and a cam that opens the pawl.

5. The system of claim 4, wherein the latch mechanism is releasable via a mechanical backup lever that moves the cam that opens the pawl.

6. The system of claim 1, wherein the mounting plate or pillar structure includes oversize mounting holes permitting shifting of the mounting plate relative to the pillar structure.

7. The system of claim 1, further comprising a door presenter mechanism disposed between the vehicle body and the vehicle door.

8. The system of claim 1, wherein the first vehicle door mates with the second vehicle door and defines an interface therebetween, wherein the embedded pillars of the first and second doors are disposed adjacent each other at the interface, wherein the interface includes a sealing arrangement including a primary seal disposed an inner side of the interface and secondary seal disposed at an outer side of the interface, wherein the primary and second seals have a constant cross-section extending substantially fully along the interface.

9. The system of claim 1, wherein the hinge module includes a first hinge bar and a second hinge bar pivotable relative to each during a door opening operation;
   a hinge pin extending between the first hinge bar and the second hinge bar, the hinge pin fixed to the first hinge bar;
   a permanent magnet fixed to the lower hinge bar;
   a ring bracket fixed to the permanent magnet;
   a steel plate biased toward the permanent magnet, wherein the steel plate locks with the ring bracket when the steel plate is in a closed position adjacent the permanent magnet, and wherein the steel plate is rotatable relative to the ring bracket when the steel plate is in an open position away from the permanent magnet;
   wherein energizing the permanent magnet shifts the steel plate from the closed position to the open position allowing relative movement between the first hinge bar and the second hinge bar.

10. The system of claim 1, wherein each of the first and second vehicle doors include a further latch mechanism, wherein the further latch is disposed on an opposite edge the vehicle door relative to the latch mechanism.

11. The system of claim 10, wherein the further latch is disposed on a lower edge of each of the first and second vehicle doors, and the latch mechanism is disposed on an upper edge of each of the first and second vehicle doors adjacent an interface between the first and second vehicle doors.

12. The system of claim 1, wherein the latch mechanism of the first vehicle door is a first latch mechanism and the first vehicle door include a second latch mechanism having a common design relative to the first latch mechanism, wherein the first latch mechanism is disposed adjacent an interface between the first and second vehicle doors, and the second latch mechanism is disposed at a hinge area of the first vehicle door.

13. A system for opening and closing a door relative to a vehicle body, the system comprising:
   first and second vehicle doors, each of the first and second vehicle doors including:

a hinge module configured for being mounted to the vehicle body;

a door module configured for being mounted to the hinge module and further configured for closing a door opening defined by the vehicle body, wherein the door module includes an embedded pillar structure disposed at a front or rear edge thereof;

wherein the door module includes a latch mechanism, the latch mechanism configured for latching with the vehicle body;

wherein the first vehicle door mates with the second vehicle door and defines an interface therebetween, wherein the embedded pillars of the first and second doors are disposed adjacent each other at the interface;

wherein the embedded pillar structure defines a closed loop adjacent the interface, wherein the closed loop is disposed at both a lower portion and an upper portion of the door module, wherein the upper portion extends to an uppermost edge of the door module and the lower portion extends to a lowermost edge of the door module;

wherein the interface includes a gap defined between the front edge and the rear edge and a sealing arrangement including a primary seal disposed of an inner side of the interface and a secondary seal disposed at an outer side of the interface, wherein the primary and second seals have a constant cross-section extending substantially fully along the interface.

14. The system of claim 13, wherein, at the location of the secondary seal, the lower portion of the gap at the interface is wider than the gap at the upper portion, and wherein filler pieces are disposed in the gap between the secondary seal and the front or rear edge of the door modules in the lower portion, such that the secondary seal members and the filler members combine to fill the gap in the lower portion.

15. The system of claim 13, wherein the primary and secondary seals are attached to a single door.

16. A system for opening and closing a door relative to a vehicle body, the system comprising:

first and second vehicle doors, each of the first and second vehicle doors including:

a hinge module configured for being mounted to the vehicle body;

a door module configured for being mounted to the hinge module and further configured for closing a door opening defined by the vehicle body, wherein the door module includes an embedded pillar structure disposed at a front or rear edge thereof;

wherein the door module includes a latch mechanism, the latch mechanism configured for latching with the vehicle body;

wherein the hinge module includes a first hinge bar and a second hinge bar pivotable relative to each other during a door opening operation;

a hinge pin extending between the first hinge bar and the second hinge bar, the hinge pin fixed to the first hinge bar;

a permanent magnet is fixed to the lower hinge bar;

a ring bracket is fixed to the permanent magnet;

a steel plate is biased toward the permanent magnet, wherein the steel plate locks with the ring bracket when the steel plate is in a closed position adjacent the permanent magnet, and wherein the steel plate is rotatable relative to the ring bracket when the steel plate is in an open position away from the permanent magnet;

wherein energizing the permanent magnet shifts the steel plate from the closed position to the open position allowing relative movement between the first hinge bar and the second hinge bar.

17. The system of claim 16, wherein the steel plate is mounted to the hinge pin and slidably attached to the hinge pin.

18. The system of claim 17, wherein the steel plate is rotationally fixed to the hinge pin.

19. The system of claim 16, wherein the first hinge bar is an upper hinge bar attached to the door module and the second hinge bar is a lower hinge bar pivotably attached to the vehicle body.

20. The system of claim 11, wherein the ring bracket includes axially projecting teeth and the steel plates includes corresponding notches for receiving the teeth in the closed position.

* * * * *